US008863809B2

(12) United States Patent
George et al.

(10) Patent No.: US 8,863,809 B2
(45) Date of Patent: Oct. 21, 2014

(54) METHODS AND SYSTEMS FOR RECYCLING OF LAMINATED MATERIALS

(75) Inventors: Panagiotis Emanuel George, Lake Tapps, WA (US); Kelsi Hurley, Seattle, WA (US); Erika Carter, Seattle, WA (US)

(73) Assignee: The Boeing Company, Chicago, IL (US)

( * ) Notice: Subject to any disclaimer, the term of this patent is extended or adjusted under 35 U.S.C. 154(b) by 287 days.

(21) Appl. No.: 13/296,228

(22) Filed: Nov. 14, 2011

(65) Prior Publication Data
US 2013/0118691 A1 May 16, 2013

(51) Int. Cl.
B32B 38/10 (2006.01)
C08J 11/08 (2006.01)
B29B 17/02 (2006.01)
B29K 105/06 (2006.01)
B29L 9/00 (2006.01)

(52) U.S. Cl.
CPC .......... B29B 17/02 (2013.01); *B29B 2017/0293* (2013.01); *C08J 11/08* (2013.01); *B29K 2105/06* (2013.01); *B29L 2009/00* (2013.01); *Y10S 156/928* (2013.01); *Y10S 156/939* (2013.01)
USPC ........... 156/752; 156/703; 156/704; 156/710; 156/711; 156/928; 156/939

(58) Field of Classification Search
CPC .................................. D06M 10/10; B03D 1/12
See application file for complete search history.

(56) References Cited

U.S. PATENT DOCUMENTS

| 5,230,944 | A | 7/1993 | Beer et al. |
| 5,304,576 | A | 4/1994 | Martinez |
| 6,271,270 | B1 | 8/2001 | Muzzy et al. |
| 6,537,341 | B2 | 3/2003 | Dannenhauer et al. |
| 8,211,259 | B2 * | 7/2012 | Sato et al. ...................... 156/247 |

(Continued)

FOREIGN PATENT DOCUMENTS

| FR | 2528352 A2 | 12/1983 |
| JP | 2003039434 A | 2/2003 |

OTHER PUBLICATIONS

AFRECAR (Affordable Recycled Carbon Fibres) Web Page, University of Nottingham, Polymer Composites Group, Dept. of Mechanical, Materials and Manufacturing Engineering, current as of Nov. 14, 2011, from Internet website at web address http://www.nottingham.ac.uk/afrecar/index.html, 1 page.

(Continued)

*Primary Examiner* — Philip Tucker
*Assistant Examiner* — Nickolas Harm

(57) ABSTRACT

In an embodiment of the disclosure, there is provided a method and system for recycling a cured composite laminate material into a delaminated recyclate that maintains a fiber volume fraction and a lamina level fiber alignment substantially the same as the cured composite laminate material. The method provides a cured composite laminate material having a fiber volume fraction and a lamina level fiber alignment. The cured composite laminate material undergoes solvent soak preconditioning, liquid solvent removal, pre-heating, and rapid heating with phase change delamination of the cured composite laminate material to obtain the delaminated recyclate that maintains a fiber volume fraction and a lamina level fiber alignment substantially the same as the cured composite laminate material.

15 Claims, 20 Drawing Sheets

(56) References Cited

U.S. PATENT DOCUMENTS

| | | | |
|---|---|---|---|
| 2002/0169222 A1 | 11/2002 | Takahiko et al. | |
| 2007/0051469 A1* | 3/2007 | Bossi et al. | 156/344 |
| 2009/0226712 A1 | 9/2009 | Handa et al. | |
| 2009/0301995 A1* | 12/2009 | Aspar et al. | 216/13 |
| 2010/0152353 A1 | 6/2010 | Kuan | |
| 2010/0154992 A1 | 6/2010 | Feinstein et al. | |
| 2010/0189629 A1 | 7/2010 | Price et al. | |
| 2010/0261014 A1 | 10/2010 | Geiger, Jr. | |
| 2012/0034407 A1* | 2/2012 | Yamanaka et al. | 428/40.2 |
| 2012/0114952 A1* | 5/2012 | Bauer et al. | 428/415 |

OTHER PUBLICATIONS

World Patents Index (WPI) AN 2003-673614, XP-002690631, Week 200364, Thomson Scientific, London, GB, 2 pages.

European Search Report, Jan. 30, 2013, for Counterpart Application No. EP12192179, The Boeing Company, 9 pages.

* cited by examiner

METHODS AND SYSTEMS FOR RECYCLING OF LAMINATED MATERIALS

BACKGROUND

1) Field of the Disclosure

The disclosure relates generally to methods and systems for recycling composite materials, and more particularly, to methods and systems for recycling composite laminate materials into recyclates that maintain a fiber volume fraction and a lamina level fiber alignment substantially the same as the composite laminate materials from which they are recycled.

2) Description of Related Art

Composite structures are used in a wide variety of applications, including in the manufacture of aircraft, spacecraft, rotorcraft, watercraft, sporting goods, wind turbine components, automobiles, trucks, and other vehicles and structures. In particular, composite structures may be made of composite multilayer laminate materials having aligned, high fiber volume fraction reinforcement, e.g., carbon fibers in a cured resin matrix, which provide strength and structural support during the life of the composite structures.

Such composite structures reaching the end of their life are typically sent to landfill or waste incinerators. Composite material waste, such as scrap, trimmings, and the like, created during the manufacturing process of such composite structures are also disposed of in the same manner. An increased awareness and need has developed for the recycling of such end of life composite structures and manufacturing waste or scrap. However, the recycling of composite laminated materials, which typically involves removal of the matrix resin to obtain the reinforcing fiber, may be challenging due to the intimate nature of the dissimilar component materials and the state in which known processes leave laminated materials after recovery.

Known processes for recycling dissimilar laminated materials and composites typically use mechanical comminution and/or pyrolysis for recovery of energy and/or select higher value components, such as carbon fibers. However, the products of such known processes may be limited in their value due to either purity issues and/or the form of the recyclate. Moreover, manual labor may be required for macro separation and sorting of such dissimilar laminated materials which may increase expense.

In addition, known processes for recycling laminated continuous fiber composites may remove the resin matrix and result in random fiber or filament materials which are only suitable for low value, low fiber volume applications. Random oriented recovered fibers may be undesirable and may be of decreased value in comparison to organized, high packing density oriented fibers used in the laminated composite materials from which they were recycled. Known processes for reorienting recovered random oriented fibers into aligned high volume fraction forms may add increased cost to manufacturing the recyclate.

Accordingly, there is a need in the art for improved systems and methods for recycling composite laminate materials for recovery of valuable fibers and resins that provide advantages over known systems and methods.

SUMMARY

This need for improved systems and methods for recycling composite laminate materials for recovery of valuable fibers and resins is satisfied. As discussed in the below detailed description, embodiments of the improved systems and methods may provide significant advantages over known systems and methods.

In an embodiment of the disclosure, there is provided a method for recycling a cured composite laminate material into a delaminated recyclate that maintains a fiber volume fraction and a lamina level fiber alignment substantially the same as the cured composite laminate material. The method comprises providing a cured composite laminate material comprising a resin matrix and a plurality of fibers having a fiber volume fraction and a lamina level fiber alignment. The method further comprises preconditioning the cured composite laminate material by soaking in one or more liquid solvents so that the cured composite laminate material substantially absorbs the one or more liquid solvents. The method further comprises removing any excess amount of the one or more liquid solvents not absorbed by the cured composite laminate material. The method further comprises pre-heating the cured composite laminate material substantially absorbed with the one or more liquid solvents to a temperature below a lowest solvent boiling point of the one or more liquid solvents. The method further comprises rapidly heating the pre-heated cured composite laminate material substantially absorbed with the one or more liquid solvents to a temperature above a highest solvent boiling point of the one or more liquid solvents, so as to effect a liquid-to-gas phase change of the one or more liquid solvents in order to delaminate the cured composite laminate material. The method further comprises obtaining a delaminated recyclate that maintains a fiber volume fraction and a lamina level fiber alignment substantially the same as the cured composite laminate material.

In another embodiment of the disclosure, there is provided a method for recycling cured composite laminate scrap into delaminated recyclate that maintains a fiber volume fraction and a lamina level fiber alignment substantially the same as the cured composite laminate scrap. The method comprises providing cured composite laminate scrap comprising a resin matrix and a plurality of fibers having a fiber volume fraction and a lamina level fiber alignment. The method further comprises reducing in size the cured composite laminate scrap via a size reduction process to obtain cured composite laminate flakes. The method further comprises contamination sorting and classifying the cured composite laminate flakes. The method further comprises preconditioning the cured composite laminate flakes by soaking in one or more liquid solvents so that the cured composite laminate flakes substantially absorb the one or more liquid solvents. The method further comprises removing any excess amount of the one or more liquid solvents not absorbed by the cured composite laminate flakes. The method further comprises pre-heating the cured composite laminate flakes substantially absorbed with the one or more liquid solvents to a temperature below a lowest solvent boiling point of the one or more liquid solvents. The method further comprises rapidly heating the pre-heated cured composite laminate flakes substantially absorbed with the one or more liquid solvents to a temperature above a highest solvent boiling point of the one or more liquid solvents, so as to effect a liquid-to-gas phase change of the one or more liquid solvents in order to delaminate the cured composite laminate flakes. The method further comprises obtaining delaminated recyclate that maintains a fiber volume fraction and a lamina level fiber alignment substantially the same as the cured composite laminate scrap.

In another embodiment of the disclosure, there is provided a system for recycling a cured composite laminate material into a delaminated recyclate that maintains a fiber volume fraction and a lamina level fiber alignment substantially the same as the cured composite laminate material. The system comprises a cured composite laminate material comprising a resin matrix and a plurality of fibers having a fiber volume fraction and a lamina level fiber alignment. The system further comprises a preconditioning solvent soak apparatus containing one or more liquid solvents for soaking the cured composite laminate material so that the cured composite laminate material substantially absorbs the one or more liquid solvents. The system further comprises a liquid solvent removal apparatus to remove any excess amount of the one or more liquid solvents not absorbed by the cured composite laminate material. The system further comprises a pre-heating energy apparatus for pre-heating the cured composite laminate material to a temperature below a lowest solvent boiling point of the one or more liquid solvents. The system further comprises a phase change delamination apparatus for rapidly heating the pre-heated cured composite laminate material substantially to a temperature above a highest solvent boiling point of the one or more liquid solvents, so as to effect a liquid-to-gas phase change of the one or more liquid solvents in order to delaminate the cured composite laminate material to obtain a delaminated recyclate that maintains a fiber volume fraction and a lamina level fiber alignment substantially the same as the cured composite laminate material.

In another embodiment of the disclosure, there is provided a method for recycling a cured composite laminate material into a delaminated recyclate that maintains a fiber volume fraction and a lamina level fiber alignment substantially the same as the cured composite laminate material. The method comprises providing a cured composite laminate material comprising a resin matrix and a plurality of fibers having a fiber volume fraction and a lamina level fiber alignment. The method further comprises thermally heating the cured composite laminate material to delaminate the cured composite laminate material. The method further comprises obtaining a delaminated recyclate comprising fibers with a resin matrix char, the delaminated recyclate maintaining a fiber volume fraction and a lamina level fiber alignment substantially the same as the cured composite laminate material.

In another embodiment of the disclosure, there is provided a system for recycling a cured composite laminate material into a delaminated recyclate that maintains a fiber volume fraction and a lamina level fiber alignment substantially the same as the cured composite laminate material. The system comprises a cured composite laminate material comprising a resin matrix and a plurality of fibers having a fiber volume fraction and a lamina level fiber alignment. The system further comprises a delamination apparatus for thermally heating the cured composite laminate material in a nitrogen atmosphere to delaminate the cured composite laminate material to obtain a delaminated recyclate comprising fibers with a resin matrix char, the delaminated recyclate maintaining a fiber volume fraction and a lamina level fiber alignment substantially the same as the cured composite laminate material.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
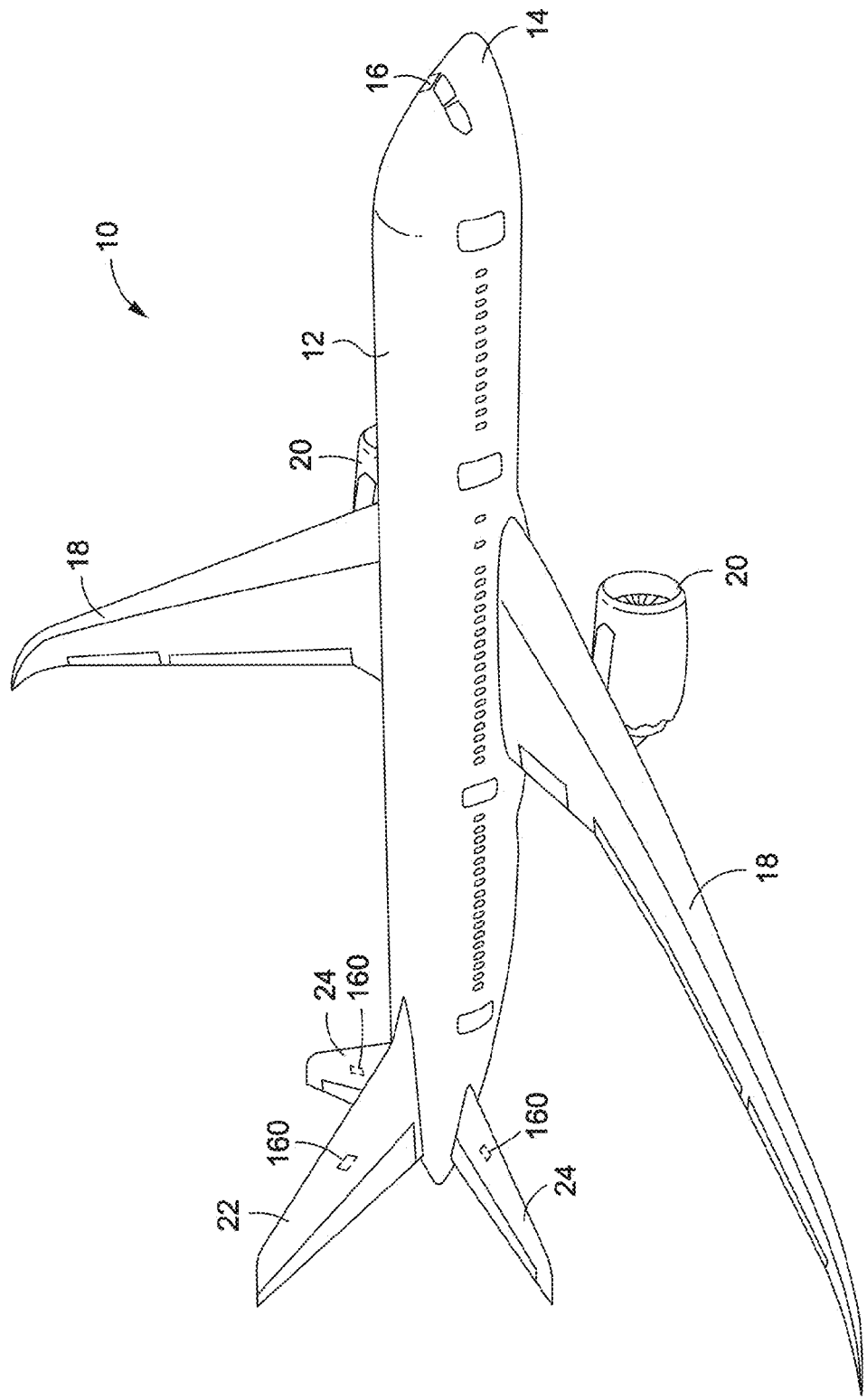
FIG. 1 is an illustration of a perspective view of an exemplary aircraft for which cured composite laminate material component parts may be recycled at an end of life of the aircraft using one of the embodiments of the systems and methods of recycling disclosed herein.

Now referring to the Figures, FIG. 1 is an illustration of a perspective view of an exemplary aircraft 10 comprising a fuselage 12, a nose 14, a cockpit 16, wings 18 operatively coupled to the fuselage 12, one or more propulsion units 20, a tail vertical stabilizer 22, and one or more tail horizontal stabilizers 24. Such known aircraft 10 may have composite parts, for example, the fuselage 12 and wings 18, that may comprise cured composite laminate material 30 (see FIGS. 3-4). When the aircraft 10 reaches its end of life, it is contemplated that cured composite laminate material 30 (see FIGS. 3-4) from the aircraft 10, such as cured composite laminate scrap 40 (see FIGS. 3-4), may be recycled using one of the embodiments of a recycling system 50 (see FIG. 3A), a recycling system 51 (see FIG. 3B), a recycling system 200 (see FIG. 4A), a recycling system 201 (see FIG. 4B), or a recycling system 600 (see FIG. 16), or a method 270 (see FIG. 5), a method 280 (see FIG. 6), a method 300 (see FIG. 12), a method 400 (see FIGS. 13A-13B), or a method 500 (see FIG. 15), disclosed herein for recycling the cured composite laminate material into a delaminated recyclate 52 (see FIGS. 3A-6) that maintains a fiber volume fraction 54a and a lamina level fiber alignment 55a (see FIGS. 3A-6) that are substantially the same as a fiber volume fraction 54 and a lamina level fiber alignment 55 (see FIGS. 3A-6) of a plurality of fibers 32 of the cured composite laminate material 30 that has been recycled.

For purposes of this application, "fiber volume fraction" means the volume of fiber in a cured composite. The fiber volume of a composite material may be determined by chemical matrix digestion, in which the resin matrix is dissolved and the fibers weighed and calculated from substituent weights and densities or a photomicrographic technique may be used in which the number of fibers in a given area of a polished cross section is counted and the volume fraction determined as the area fraction of each constituent.

For purposes of this application "lamina level fiber alignment" means aligned fibers at the lamina level. For example, the size scale for homogeneity includes the smallest scale called the micromechanics level which takes the individual fibers and the separate resin matrix in between the fibers as the size scale for homogeneity. The next intermediate scale is the aligned fibers at the lamina level, which is much larger than the size of the individual fibers. The next largest scale is the laminate level, which is a much larger scale than the lamina level and involves the stacking of various lamina in various directions. Preferably, the intermediate lamina level scale has a proper balance between small scale detail and large scale inclusion of all the possible failure mechanisms which could be operative.

Although the aircraft 10 shown in FIG. 1 is generally representative of a commercial passenger aircraft, the recycling systems 50, 51, 200, 201, 600 and methods 270, 280, 300, 400, and 500 disclosed herein may also be used to recycle other types of end of life aircraft, as well as spacecraft, rotorcraft, automobiles, watercraft, sporting goods, wind turbine components or other structures or components having cured composite laminate material that can be recycled. Moreover, the teachings of the disclosed embodiments may be applied to recycle laminate materials, such as cured composite laminate materials, used in the manufacturing and production of aircraft, spacecraft, rotorcraft, automobiles, watercraft, sporting goods, wind turbine components or other structures or components having such laminate materials that can be recycled. Manufacturing waste created in the production of laminate materials, such as cured composite laminate materials, may comprise scrap, trimmings, chips, cut-offs, tooling, unused material, scrapped components, out of date components, or other suitable manufacturing waste.

Figure 2A:
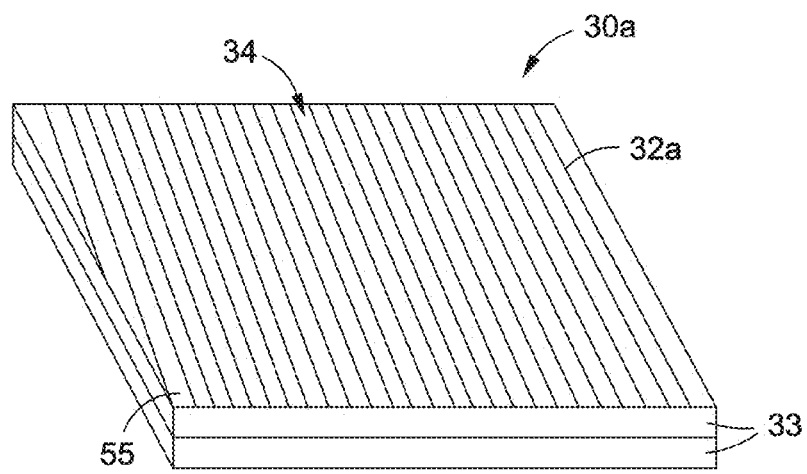
FIG. 2A is an illustration of a perspective view of a cured composite laminate material having a continuous, aligned fiber orientation enabling high fiber volume packing efficiency.
Figure 2B:
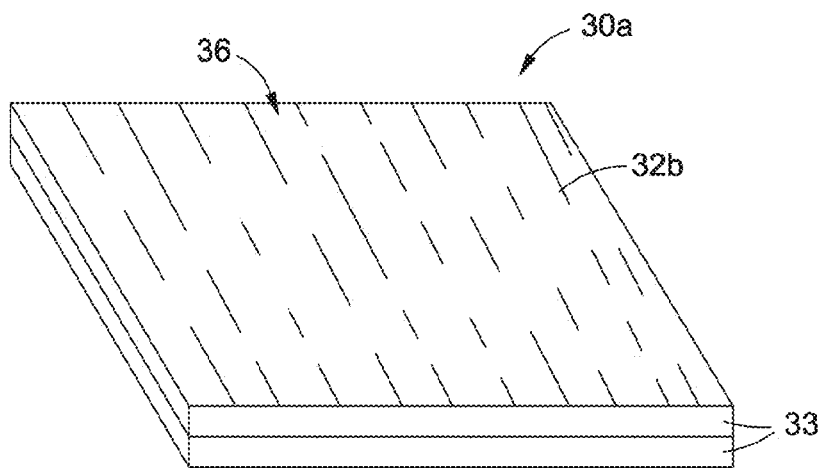
FIG. 2B is an illustration of a perspective view of a cured composite laminate material having a discontinuous, aligned fiber orientation enabling high fiber volume packing efficiency.
Figure 2C:
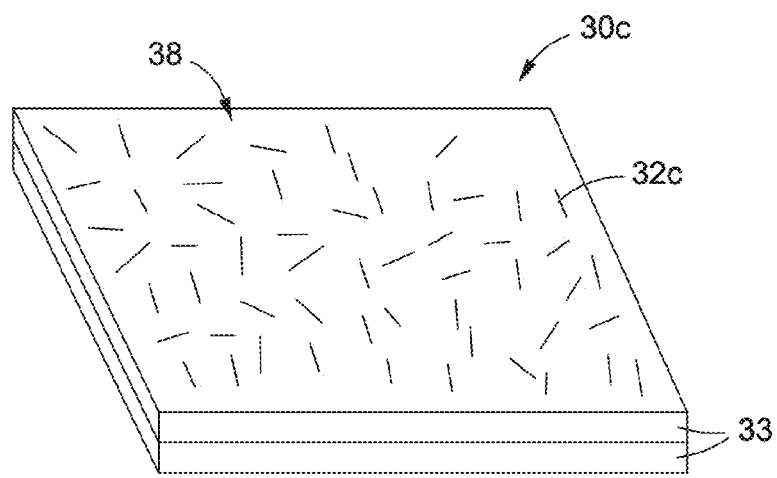
FIG. 2C is an illustration of a perspective view of a cured composite laminate material having a discontinuous, random fiber orientation, preventing high fiber volume packing efficiency.

FIG. 2A is an illustration of a perspective view of a cured composite laminate material 30a having fiber reinforcement provided by a plurality of fibers 32a. The laminate material 30a preferably comprises two or more lamina layers 33 or plies. The fibers 32a have a continuous, aligned fiber orientation 34 enabling high fiber volume packing efficiency. The recycling systems and methods disclosed herein are preferably directed at recycling cured composite laminate material 30 having a fiber volume fraction 54 (see FIGS. 3-6) and a lamina level fiber alignment 55 (see FIG. 2A and FIGS. 3-6) in the form of a continuous, aligned fiber orientation 34, into a delaminated recyclate 52 that maintains or preserves the fiber volume fraction 54 (see FIGS. 3-6) and the lamina level fiber alignment 55 (see FIG. 2A and FIGS. 3-6) in the form of the continuous, aligned fiber orientation 34. FIG. 2B is an illustration of a perspective view of a cured composite laminate material 30b having fiber reinforcement provided by a plurality of fibers 32b. The fibers 32b have a discontinuous, aligned fiber orientation 36 also enabling high fiber volume packing efficiency. FIG. 2C is an illustration of a perspective view of a cured composite laminate material 30c having fiber reinforcement provided by a plurality of fibers 32c. The fibers 32c are not aligned and have a discontinuous, random fiber orientation 38 that prevents high fiber volume packing efficiency.

Figure 3A:
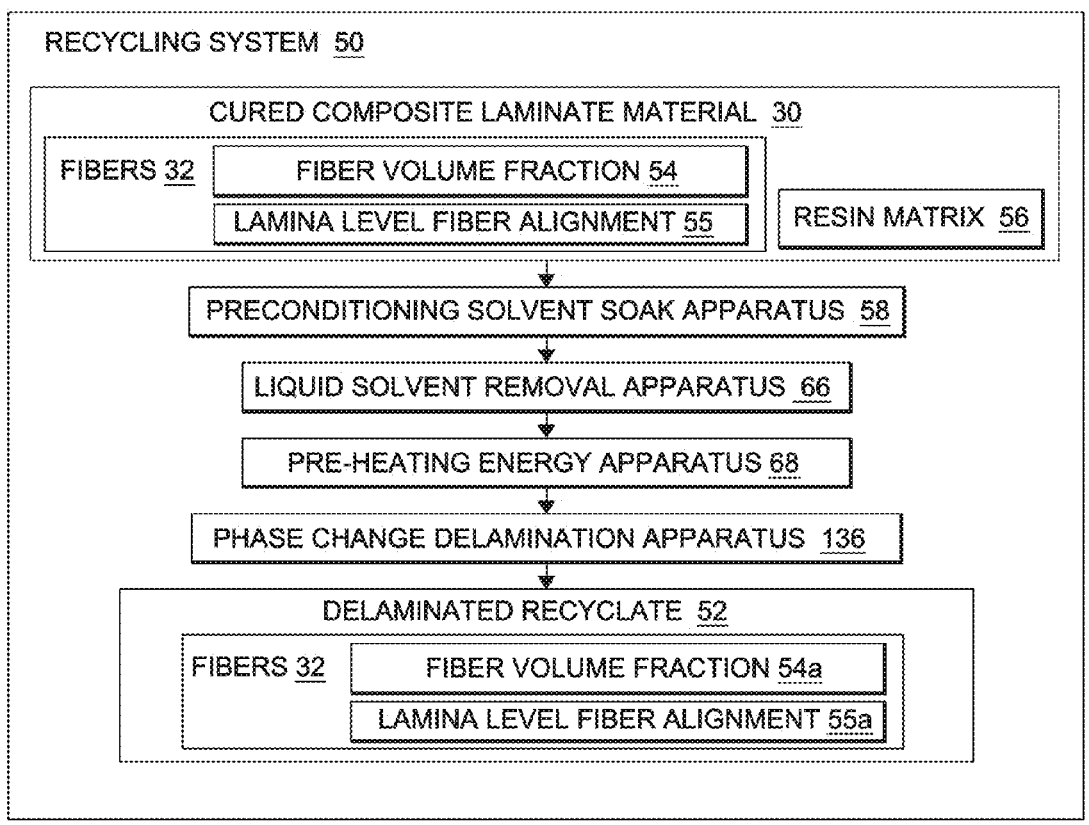
FIG. 3A is an illustration of a block diagram of one of the embodiments of a system for recycling a cured composite laminate material into a delaminated recyclate of the disclosure.

In one of the embodiments of the disclosure, there is provided a recycling system 50 for recycling a cured composite laminate material 30 into a delaminated recyclate 52 that maintains a fiber volume fraction 54a (see FIGS. 3A-6) and a lamina level fiber alignment 55a (see FIGS. 3A-6) that are substantially the same as a fiber volume fraction 54 (see FIGS. 3A-6) and a lamina level fiber alignment 55 (see FIG. 2A and FIGS. 3A-6) of a plurality of fibers 32 (see FIGS. 3A-6) of the cured composite laminate material 30. FIG. 3A is an illustration of a block diagram of one of the embodiments of the recycling system 50 for recycling a cured composite laminate material 30 into a delaminated recyclate 52. As shown in FIG. 3, the recycling system 50 comprises a cured composite laminate material 30 comprising a resin matrix 56 and a plurality of fibers 32 having a fiber volume fraction 54 (see FIGS. 3A-6) and a lamina level fiber alignment 55 (see FIG. 2A and FIGS. 3A-6), preferably in the form of the continuous, aligned fiber orientation 34 (see FIG. 2A). The cured composite laminate material 30 may comprise manufacturing scrap, end-of-life scrap, trimmings, chips, cutoffs, tooling, unused material, scrapped components, out of date components, or other suitable cured composite laminate material to be recycled.

The cured composite laminate material 30 may be comprised of fiber reinforced thermoset or thermoplastic composite having reinforcing fibers in a resin matrix. The reinforcing fibers may be made of a material comprising carbon, graphite, glass, boron, ceramics, aramids, polyolefins, polyethylenes, polymers, or other suitable materials. The resin matrix 56 may be made of a resin material comprising thermoplastic resins such as polyamides, polyesters, polyolefins and fluoropolymers; thermosetting resins such as epoxies, bismaelimides, polyimides, bezoxazines, cyanate esters, and polyesters; hybrid polymer resins with properties of both thermosetting resins and thermoplastic resins; or other suitable resin materials.

As shown in FIG. 3A, the recycling system 50 further comprises a preconditioning solvent soak apparatus 58 containing one or more liquid solvents 60 (see FIG. 5) for soaking via a preconditioning solvent soak process 61 (see FIG. 5) the cured composite laminate material 30, so that the cured composite laminate material 30 substantially absorbs the one or more liquid solvents 60. The one or more liquid solvents 60 may comprise water, benzyl alcohol, acetone, methyl ethyl ketone (MEK), hydrochloric acid, a combination of one or more thereof, or another suitable liquid solvent. The preconditioning solvent soak apparatus 58 may comprise an open or closed container or vessel. Optionally, the preconditioning solvent soak process 61 may be conducted with heat 62 (see FIG. 5), pressure 64 (see FIG. 5), or a combination of heat 62 and pressure 64.

As shown in FIG. 3A, the recycling system 50 further comprises a liquid solvent removal apparatus 66 to remove via a liquid solvent removal process 67 (see FIG. 5) any excess amount of the one or more liquid solvents 60 not absorbed by the cured composite laminate material 30. The liquid solvent removal process 67 may comprise evaporation by exposure to air or another suitable evaporation process.

Figure 8:
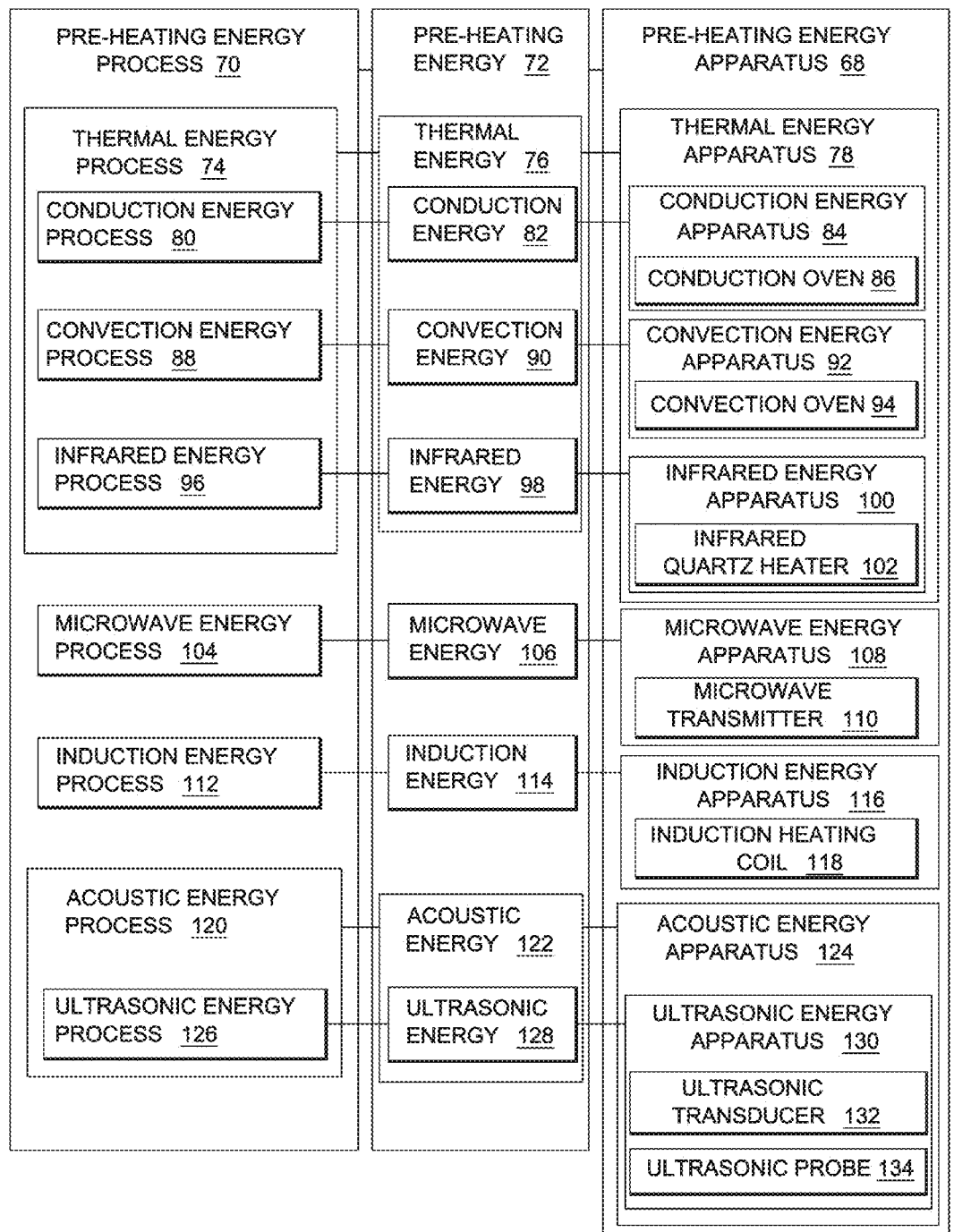
FIG. 8 is an illustration of a block diagram of exemplary embodiments of pre-heating energy processes, pre-heating energies, and pre-heating energy apparatuses that may be used in embodiments of the disclosed methods and systems of the disclosure.

As shown in FIG. 3A, the recycling system 50 further comprises a pre-heating energy apparatus 68 for pre-heating the cured composite laminate material 30 to a temperature below a lowest solvent boiling point of the one or more liquid solvents 60. FIG. 8 is an illustration of a block diagram of exemplary embodiments of pre-heating energy processes 70, pre-heating energies 72, and pre-heating energy apparatuses 68 that may be used in embodiments of the disclosed methods and systems of the disclosure. The pre-heating energy process 70 may comprise a thermal energy process 74. The thermal energy process 74 provides a thermal energy 76 via a thermal energy apparatus 78. The thermal energy process 74 may comprise a conduction energy process 80 that provides a conduction energy 82 via a conduction energy apparatus 84, such as a conduction oven 86. The thermal energy process 74 may further comprise a convection energy process 88 that provides a convection energy 90 via a convection energy apparatus 92, such as a convection oven 94. The thermal energy process 74 may further comprise an infrared energy process 96 that provides an infrared energy 98 via an infrared energy apparatus 100, such as an infrared quartz heater 102. The pre-heating energy process 70 may further comprise another suitable thermal energy process 74 providing another suitable pre-heating energy 72 via another suitable pre-heating energy apparatus 68. The pre-heating energy process 70 may further comprise a microwave energy process 104 that provides a microwave energy 106 via a microwave energy apparatus 108, such as a microwave transmitter 110. The pre-heating energy process 70 may further comprise another suitable microwave energy process 104 providing another suitable microwave energy 106 via another suitable microwave energy apparatus 108. The pre-heating energy process 70 may further comprise an induction energy process 112 that provides an induction energy 114 via an induction energy apparatus 116, such as an induction heating coil 118. The pre-heating energy process 70 may further comprise another suitable induction energy process 112 providing another suitable induction energy 114 via another suitable induction energy apparatus 116. The pre-heating energy process 70 may further comprise an acoustic energy process 120 that provides an acoustic energy 122 via an acoustic energy apparatus 124. The acoustic energy process 120 may comprise an ultrasonic energy process 126 that provides an ultrasonic energy 128 via an ultrasonic energy apparatus 130, such as an ultrasonic transducer 132 or an ultrasonic probe 134. Preferably, the pre-heating energy process 70 is conducted in a partial pressure environment 73 with a high partial pressure with a desired pre-heating energy 72, as discussed above.

As shown in FIG. 3A, the recycling system 50 further comprises a phase change delamination apparatus 136 for rapidly heating with a rapid heating energy 138 (see FIG. 5) via a phase change delamination process 142 (see FIG. 5) the pre-heated cured composite laminate material 30 substantially to a temperature above a highest solvent boiling point of the one or more liquid solvents 60, so as to effect a solvent liquid-to-gas phase change 140 (see FIG. 5) of the one or more liquid solvents 60, in order to delaminate the cured composite laminate material 30 to obtain a delaminated recyclate 52. Preferably, the delaminated recyclate 52 maintains a fiber volume fraction 54a (see FIGS. 3A-6) and a lamina level fiber alignment 55a (see FIGS. 3A-6) of the plurality of fibers 32 that are substantially the same as a fiber volume fraction 54 (see FIGS. 3A-6) and a lamina level fiber alignment 55 (see FIG. 2A and FIGS. 3A-6) of the plurality of fibers 32 (see FIGS. 3A-6) of the cured composite laminate material 30.

Figure 9:
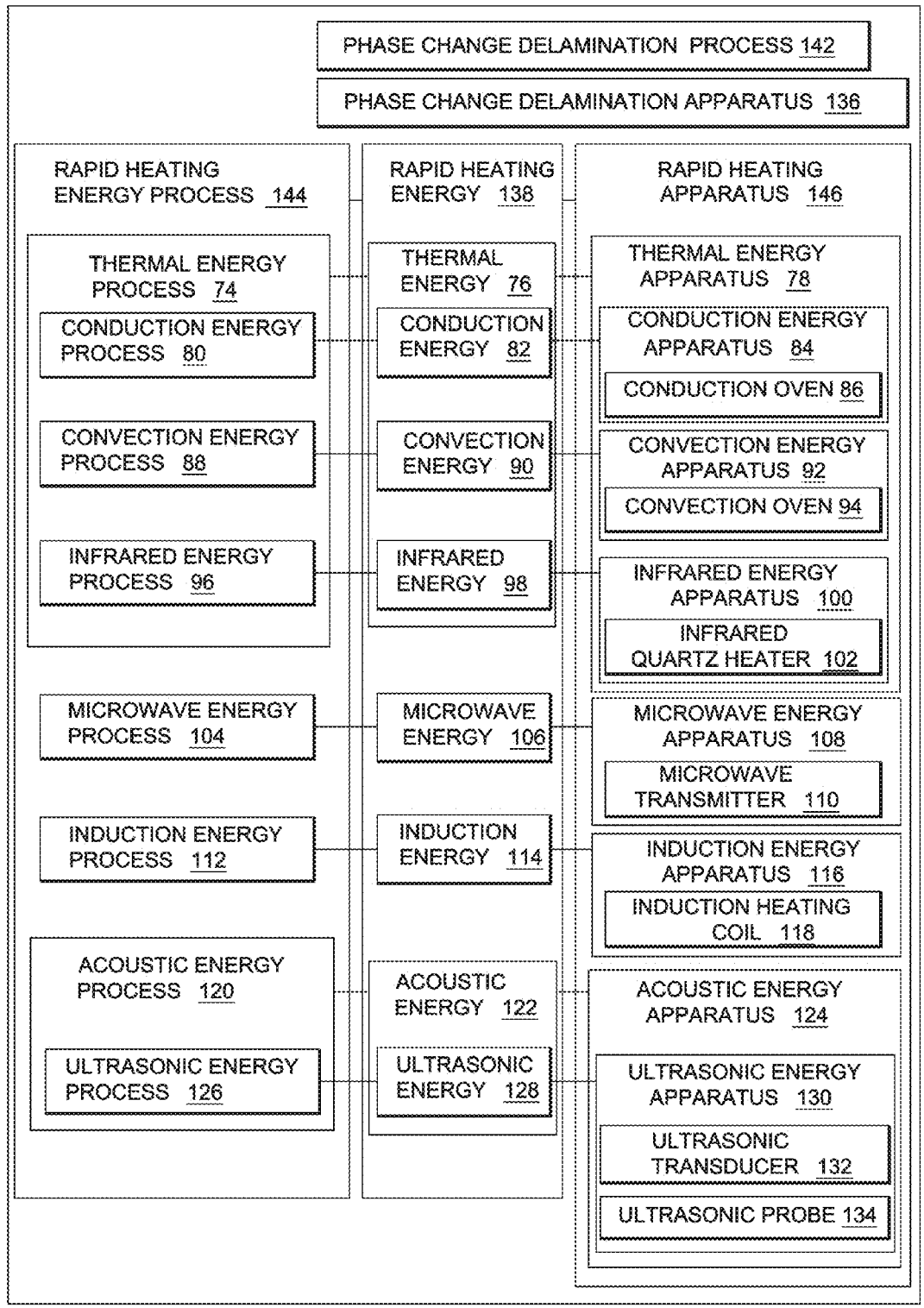
FIG. 9 is an illustration of a block diagram of exemplary embodiments of the phase change delamination process and phase change delamination apparatus that may be used in embodiments of the disclosed methods and systems of the disclosure.

FIG. 9 is an illustration of a block diagram of exemplary embodiments of the phase change delamination process 142 and phase change delamination apparatus 136 that may be used in embodiments of the disclosed methods and systems of the disclosure. As shown in FIG. 9, the phase change delamination process 142 may comprise a plurality of heating energy processes 144, rapid heating energies 138, and heating energy apparatuses 146. The heating energy process 144 may comprise a thermal energy process 74. The thermal energy process 74 provides a thermal energy 76 via a thermal energy apparatus 78. The thermal energy process 74 may comprise a conduction energy process 80 that provides a conduction energy 82 via a conduction energy apparatus 84, such as a conduction oven 86. The thermal energy process 74 may further comprise a convection energy process 88 that provides a convection energy 90 via a convection energy apparatus 92, such as a convection oven 94. The thermal energy process 74 may further comprise an infrared energy process 96 that provides an infrared energy 98 via an infrared energy apparatus 100, such as an infrared quartz heater 102. The heating energy process 144 may further comprise another suitable thermal energy process 74 providing another suitable rapid heating energy 138 via another suitable heating energy apparatus 146. The heating energy process 144 may further comprise a microwave energy process 104 that provides a microwave energy 106 via a microwave energy apparatus 108, such as a microwave transmitter 110. The heating energy process 144 may further comprise another suitable microwave energy process 104 providing another suitable microwave energy 106 via another suitable microwave energy apparatus 108. The heating energy process 144 may further comprise an induction energy process 112 that provides an induction energy 114 via an induction energy apparatus 116, such as an induction heating coil 118. The heating energy process 144 may further comprise another suitable induction energy process 112 providing another suitable induction energy 114 via another suitable induction energy apparatus 116. The heating energy process 144 may further comprise an acoustic energy process 120 that provides an acoustic energy 122 via an acoustic energy apparatus 124. The acoustic energy process 120 may comprise an ultrasonic energy process 126 that provides an ultrasonic energy 128 via an ultrasonic energy apparatus 130, such as an ultrasonic transducer 132 or an ultrasonic probe 134.

Figure 3B:
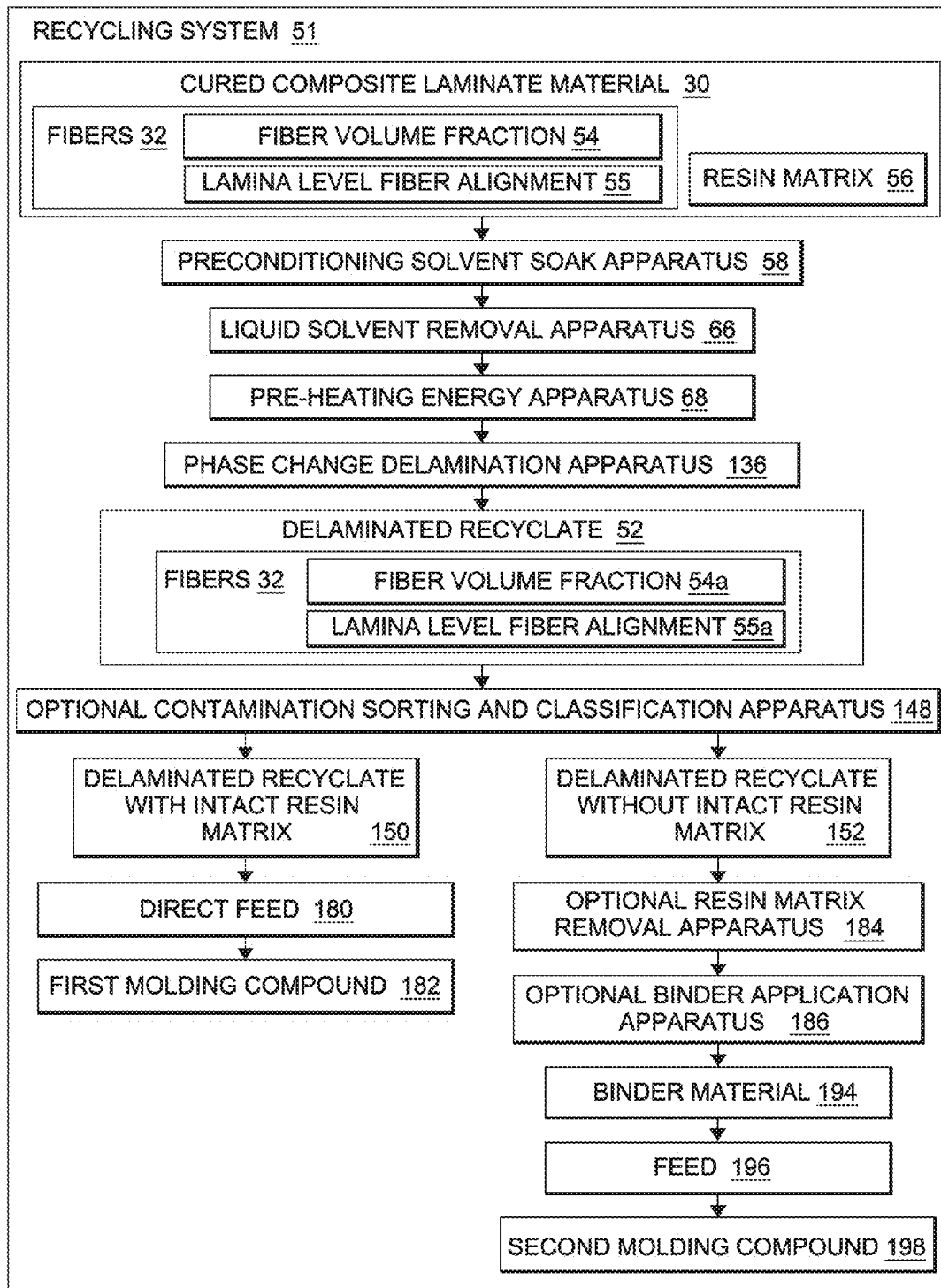
FIG. 3B is an illustration of a block diagram of another one of the embodiments of a system for recycling a cured composite laminate material into a delaminated recyclate of the disclosure.

FIG. 3B is an illustration of a block diagram of another one of the embodiments of a recycling system 51 for recycling a cured composite laminate material 30 into a delaminated recyclate 52. The recycling system 51 shown in FIG. 3B comprises the same elements as the recycling system 50 of FIG. 3A and may further comprise additional elements. As shown in FIG. 3B, the recycling system 51 comprises the cured composite laminate material 30 with the plurality of fibers 32 having a fiber volume fraction 54 and a lamina level fiber alignment 55. The cured composite laminate material 30 further comprises a resin matrix 56. The recycling system 51 further comprises the preconditioning solvent soak apparatus 58, the liquid solvent removal apparatus 66, the pre-heating energy apparatus 68, and the phase change delamination apparatus 136. The phase change delamination apparatus 136 rapidly heats with a rapid heating energy 138 (see FIG. 5) via a phase change delamination process 142 (see FIG. 5) the pre-heated cured composite laminate material 30 substantially to a temperature above a highest solvent boiling point of the one or more liquid solvents 60, so as to effect a solvent liquid-to-gas phase change 140 (see FIG. 5) of the one or more liquid solvents 60 in order to delaminate the cured composite laminate material 30 to obtain a delaminated recyclate 52. Preferably, the delaminated recyclate 52 maintains a fiber volume fraction 54a (see FIGS. 3A-6) and a lamina level fiber alignment 55a (see FIGS. 3A-6) of the plurality of fibers 32 that are substantially the same as a fiber volume fraction 54 (see FIGS. 3A-6) and a lamina level fiber alignment 55 (see FIG. 2A and FIGS. 3A-6) of the plurality of fibers 32 (see FIGS. 3A-6) of the cured composite laminate material 30.

Figure 10:
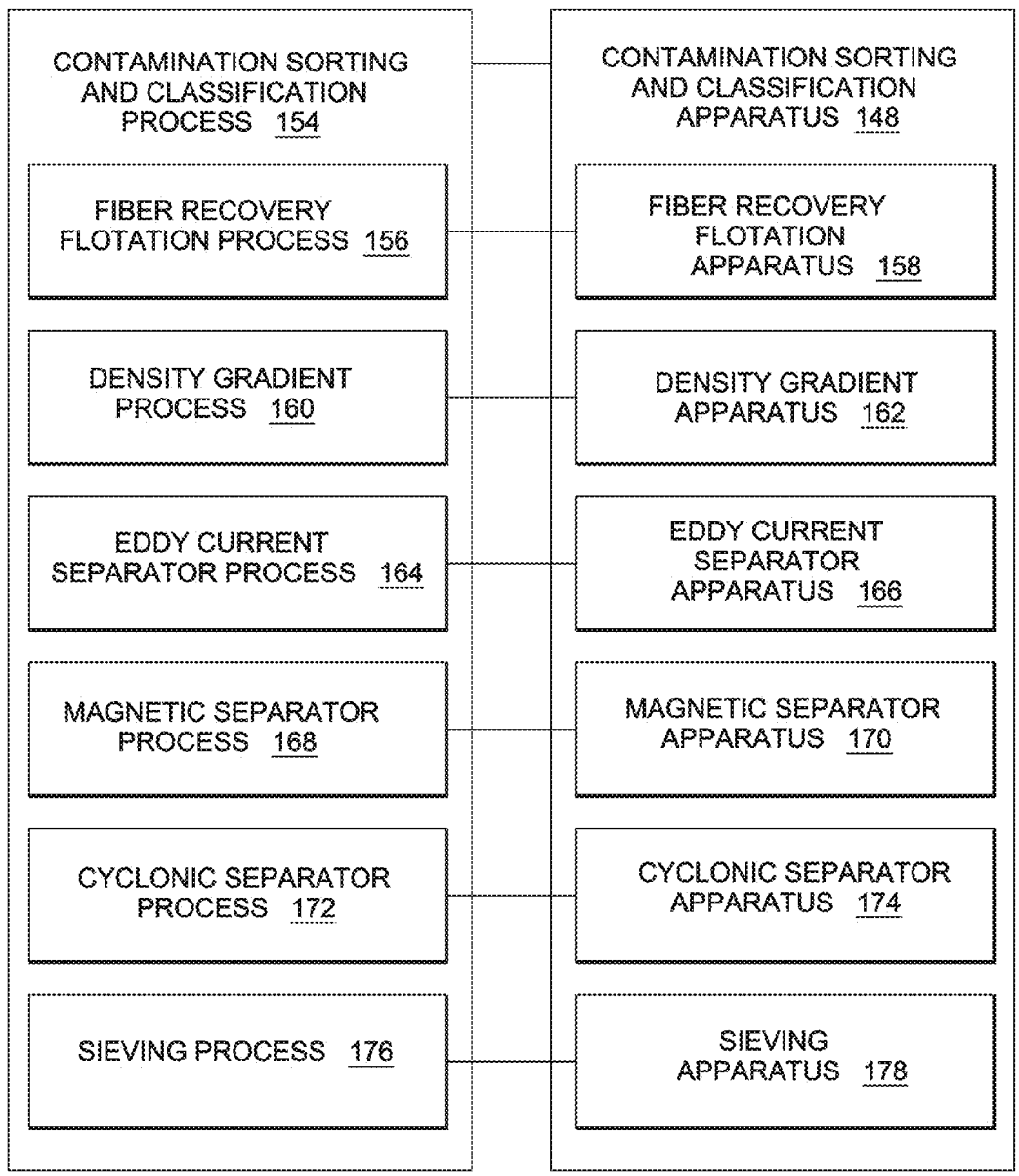
FIG. 10 is an illustration of a block diagram of exemplary embodiments of contamination sorting and classification processes and contamination sorting and classification apparatuses that may be used in embodiments of the disclosed methods and systems of the disclosure.

As shown in FIG. 3B, the recycling system 51 may further comprise a contamination sorting and classification apparatus 148 for contamination sorting and classifying the delaminated recyclate 52 into delaminated recyclate with an intact resin matrix 150 and delaminated recyclate without an intact resin matrix 152. FIG. 10 is an illustration of a block diagram of exemplary embodiments of contamination sorting and classification processes 154 and contamination sorting and classification apparatuses 148 that may be used in embodiments of the disclosed methods and systems of the disclosure. As shown in FIG. 10, the contamination sorting and classification process 154 and the contamination sorting and classification apparatus 148 may respectively comprise a fiber recovery flotation process 156 using a fiber recovery flotation apparatus 158. The contamination sorting and classification process 154 and the contamination sorting and classification apparatus 148 may respectively further comprise a density gradient process 160 using a density gradient apparatus 162. The contamination sorting and classification process 154 and the contamination sorting and classification apparatus 148 may respectively further comprise an eddy current separator process 164 using an eddy current separator apparatus 166. The contamination sorting and classification process 154 and the contamination sorting and classification apparatus 148 may respectively further comprise a magnetic separator process 168 using a magnetic separator apparatus 170. The contamination sorting and classification process 154 and the contamination sorting and classification apparatus 148 may respectively further comprise a cyclonic separator process 172 using a cyclonic separator apparatus 174. The contamination sorting and classification process 154 and the contamination sorting and classification apparatus 148 may respectively further comprise a sieving process 176 using a sieving apparatus 178. The contamination sorting and classification process 154 and the contamination sorting and classification apparatus 148 may respectively further comprise another suitable contamination sorting and classification process 154 and another suitable contamination sorting and classification apparatus 148.

Figure 14:
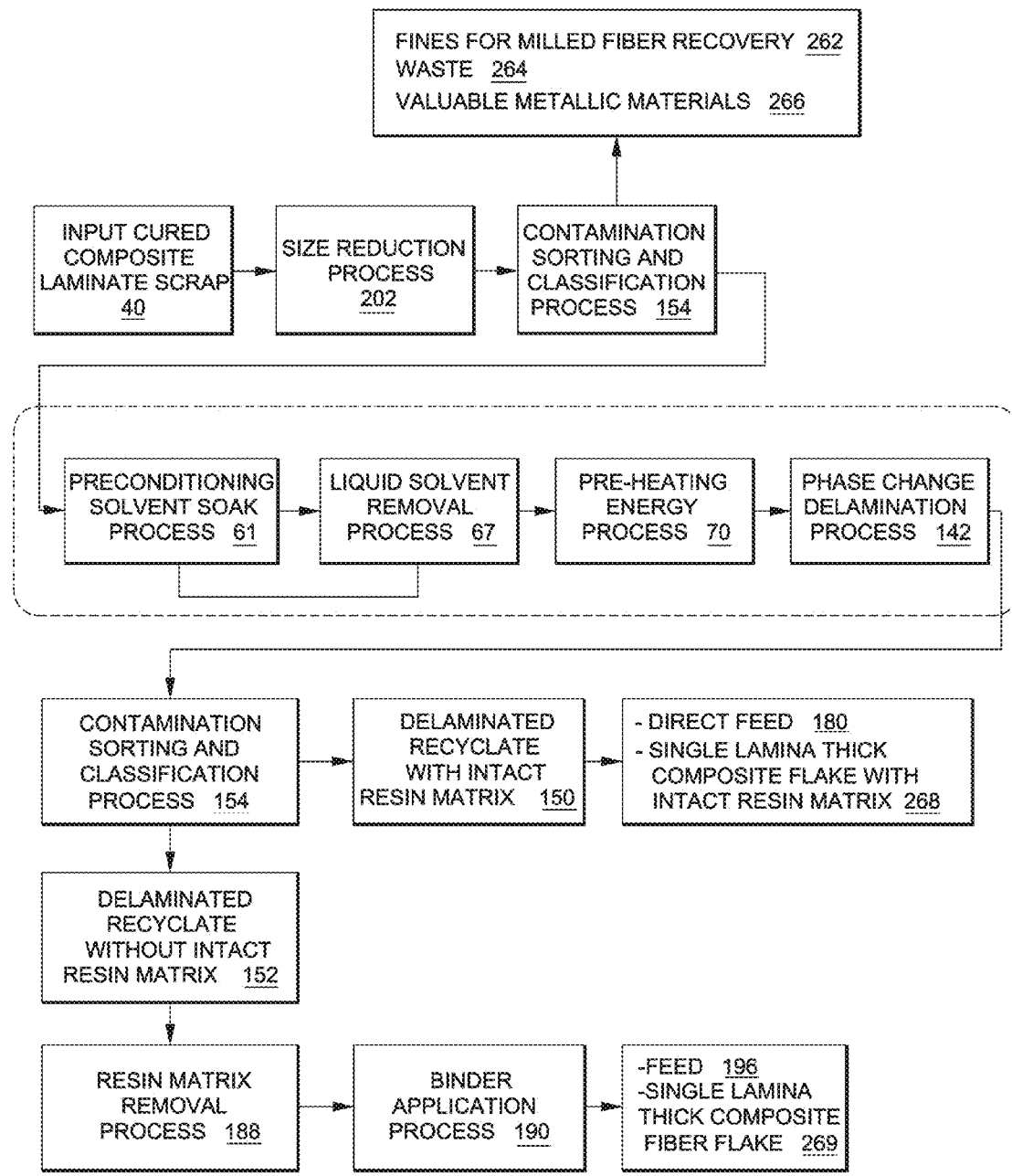
FIG. 14 is an illustration of a schematic diagram of a summary of steps of exemplary embodiments of methods and systems of the disclosure.

As shown in FIG. 3B, the delaminated recyclate with the intact resin matrix 150 may be used as a direct feed 180 for a first molding compound 182. In one embodiment, as shown in FIG. 14, the direct feed 180 may comprise a single lamina thick composite flake with an intact resin matrix 268. Alternatively, as shown in FIG. 3B, the delaminated recyclate without the intact resin 152 may be further processed, and the recycling system 51 further comprises a resin matrix removal apparatus 184 and a binder application apparatus 186. The resin matrix removal apparatus 184 uses a resin matrix removal process 188 for removing the resin matrix 56 from the delaminated recyclate without the intact resin 152. The resin matrix removal process 188 may comprise known pyrolysis processes to remove the resin matrix or may comprise another suitable resin matrix removal process. The binder application apparatus 186 preferably uses a binder application process 190 to apply a binder material 194 to the plurality of fibers 32 in order to keep the fibers 32 intact. The delaminated recyclate 52 with the binder material 194 may then be used as feed 196 for a second molding compound 198. In one embodiment, as shown in FIG. 14, the feed 190 may comprise a single lamina thick composite fiber flake 269.

Figure 4A:
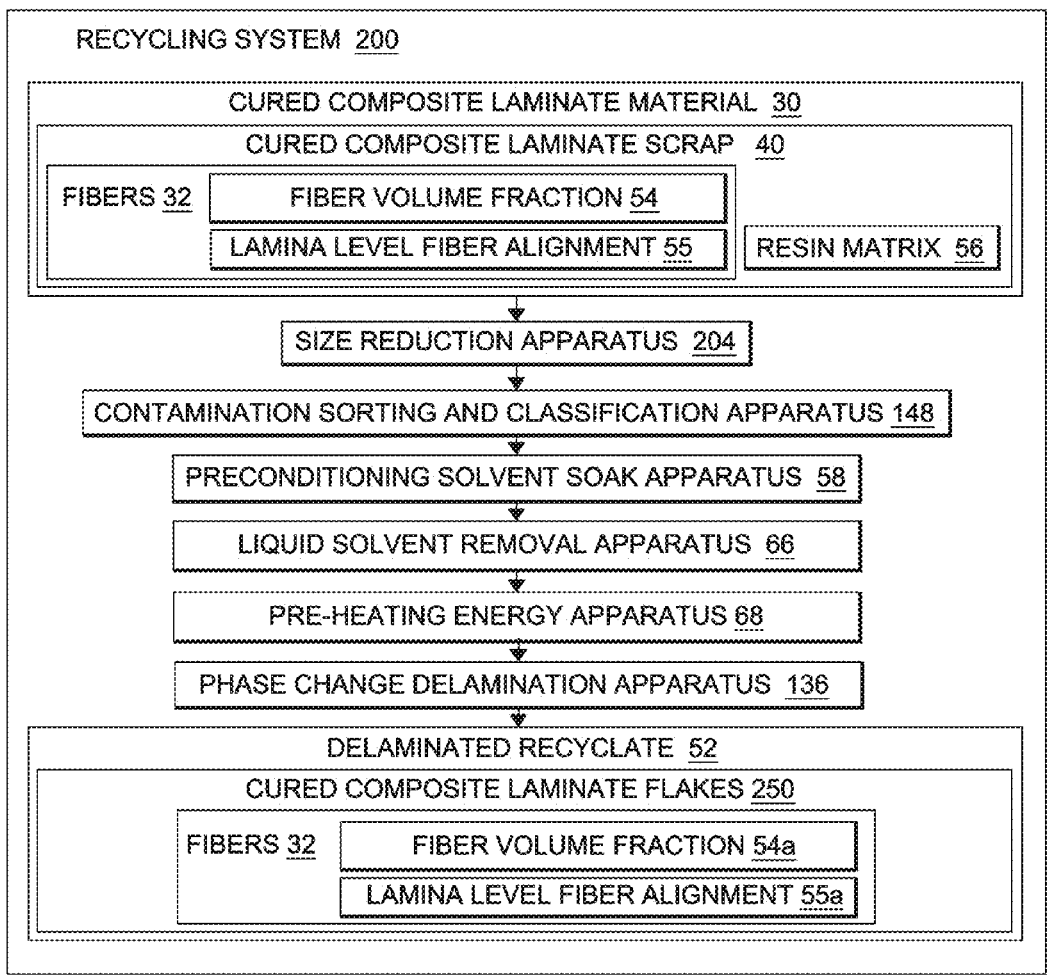
FIG. 4A is an illustration of a block diagram of another one of the embodiments of a system for recycling a cured composite laminate material into a delaminated recyclate of the disclosure.
Figure 6:
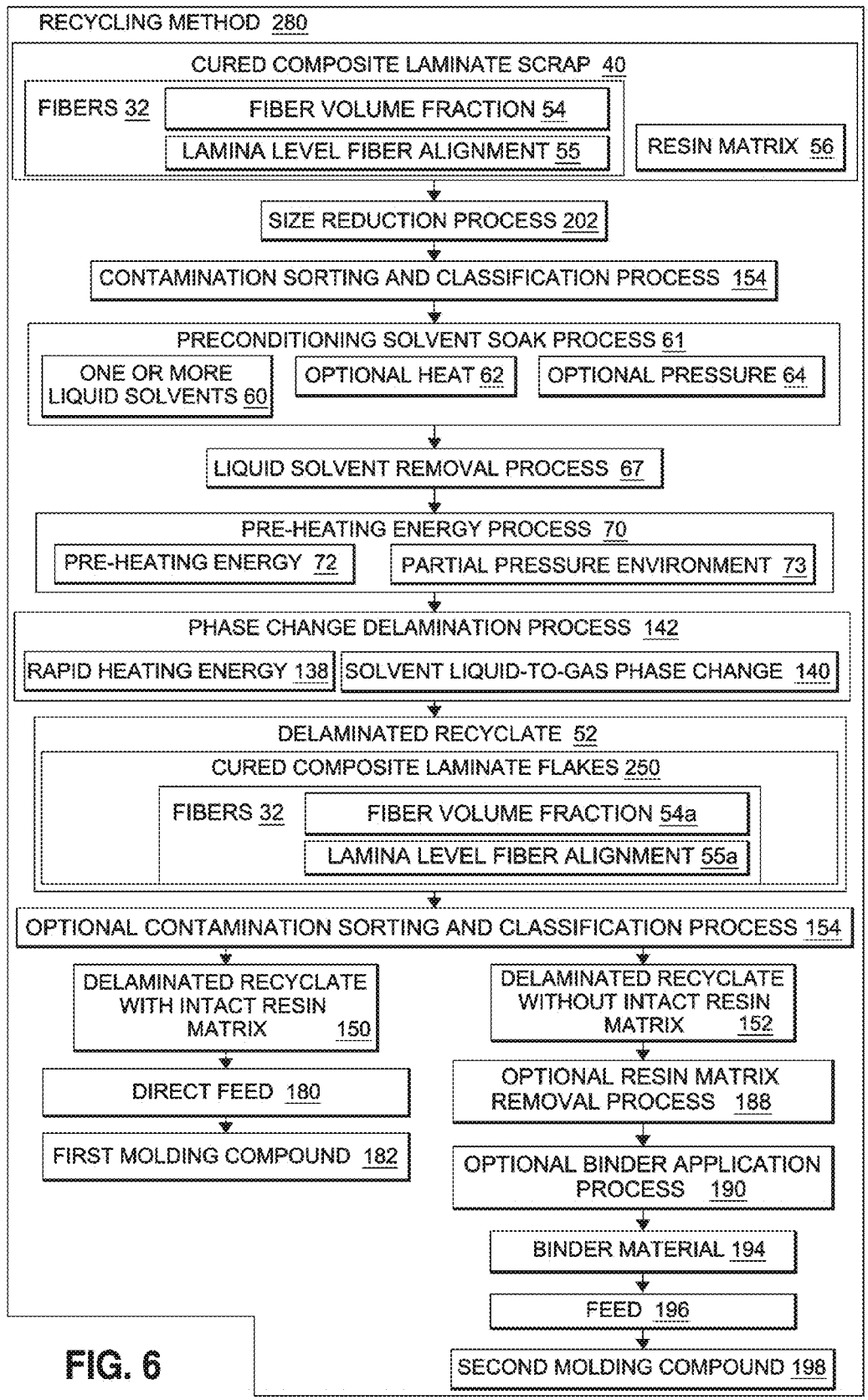
FIG. 6 is an illustration of a block diagram of another one of the embodiments of a method for recycling a cured composite laminate material into a delaminated recyclate of the disclosure.
Figure 7:
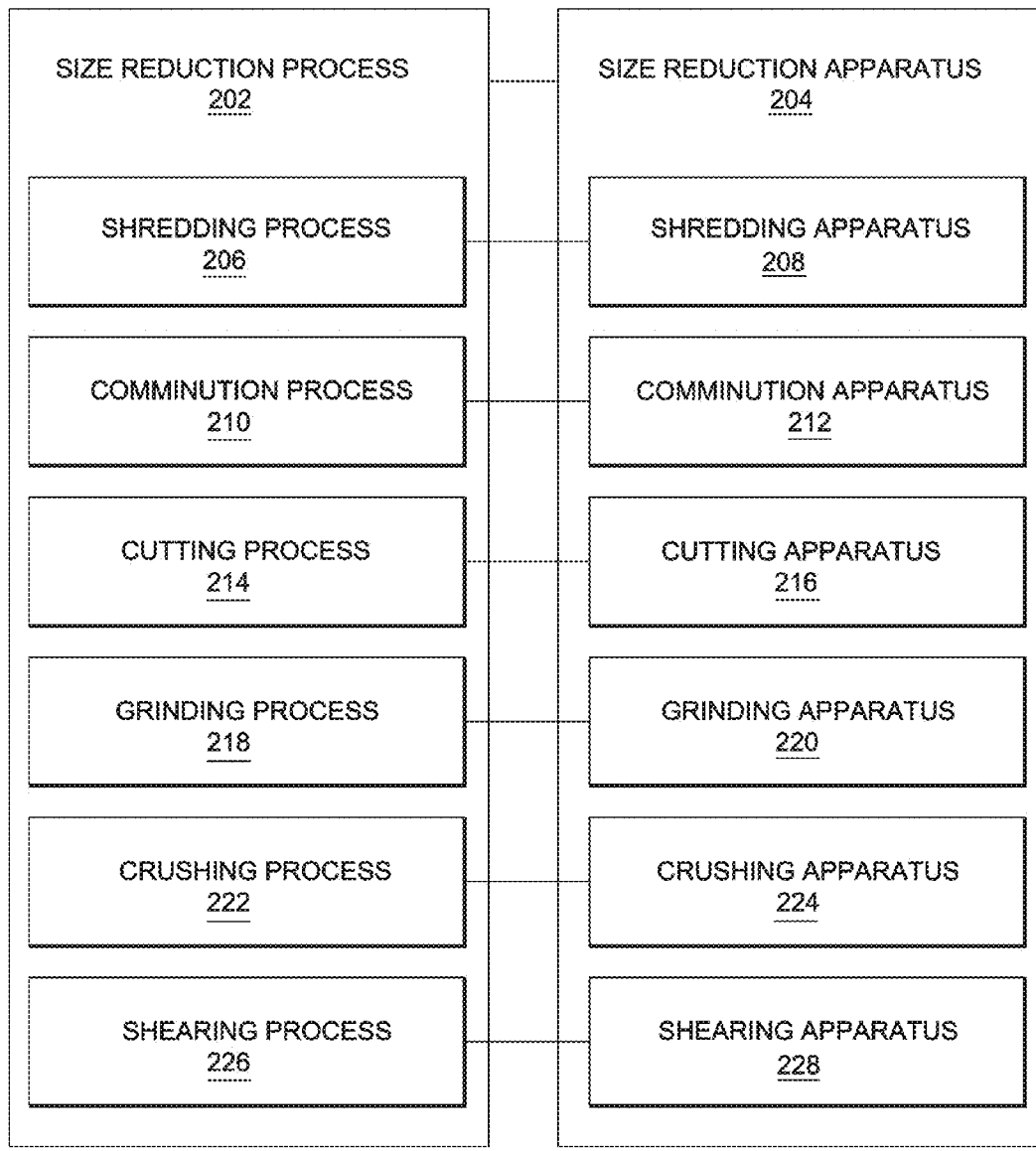
FIG. 7 is an illustration of a block diagram of exemplary embodiments of size reduction processes and size reduction apparatuses that may be used in embodiments of the disclosed methods and systems of the disclosure.

FIG. 4A is an illustration of a block diagram of another one of the embodiments of a recycling system 200 for recycling a cured composite laminate material 30, preferably in the form of cured composite laminate scrap 40, into a delaminated recyclate 52, preferably in the form of cured composite laminate flakes 250. In this embodiment, which is similar to the recycling system 50, the recycling system 200 further comprises a size reduction apparatus 204 used in a size reduction process 202 (see FIG. 6). The size reduction process 202 is conducted prior to the preconditioning solvent soak process 61 (see FIG. 5) used with the preconditioning solvent soak apparatus 58. FIG. 7 is an illustration of a block diagram of exemplary embodiments of the size reduction processes 202 and size reduction apparatuses 204 that may be used in embodiments of the disclosed methods and systems of the disclosure. As shown in FIG. 7, the size reduction process 202 and size reduction apparatus 204 may respectively comprise a shredding process 206 using a shredding apparatus 208. The size reduction process 204 and size reduction apparatus 202 may further respectively comprise a comminution process 210 using a comminution apparatus 212. The size reduction process 204 and size reduction apparatus 202 may further respectively comprise a cutting process 214 using a cutting apparatus 216. The size reduction process 204 and size reduction apparatus 202 may further respectively comprise a grinding process 218 using a grinding apparatus 220. The size reduction process 204 and size reduction apparatus 202 may further respectively comprise a crushing process 222 using a crushing apparatus 224. The size reduction process 204 and size reduction apparatus 202 may further respectively comprise a shearing process 226 using a shearing apparatus 228. The size reduction process 204 and size reduction apparatus 202 may further respectively comprise another suitable size reduction process 204 and another suitable size reduction apparatus 202.

Further, as shown in FIG. 4A, in this embodiment, the recycling system 200 comprises, prior to the preconditioning soak process 61 (see FIG. 5) used with the preconditioning solvent soak apparatus 58, the contamination sorting and classification apparatus 148 for contamination sorting and classifying the cured composite laminate material 30 that has been reduced in size. The contamination sorting and classification apparatus 148 and the contamination sorting and classification process 154 are shown in FIG. 10 and discussed in detail above.

As shown in FIG. 4A, the recycling system 200 comprises the preconditioning solvent soak apparatus 58, the liquid solvent removal apparatus 66, the pre-heating energy apparatus 68, the phase change delamination apparatus 136, and the delaminated recyclate 52. The delaminated recyclate 52 preferably maintains a fiber volume fraction 54a and a lamina level fiber alignment 55a of the plurality of fibers 32 that are substantially the same as a fiber volume fraction 54 and a lamina level fiber alignment 55 of the plurality of fibers 32 (see FIGS. 3A-6) of the cured composite laminate material 30.

Figure 4B:
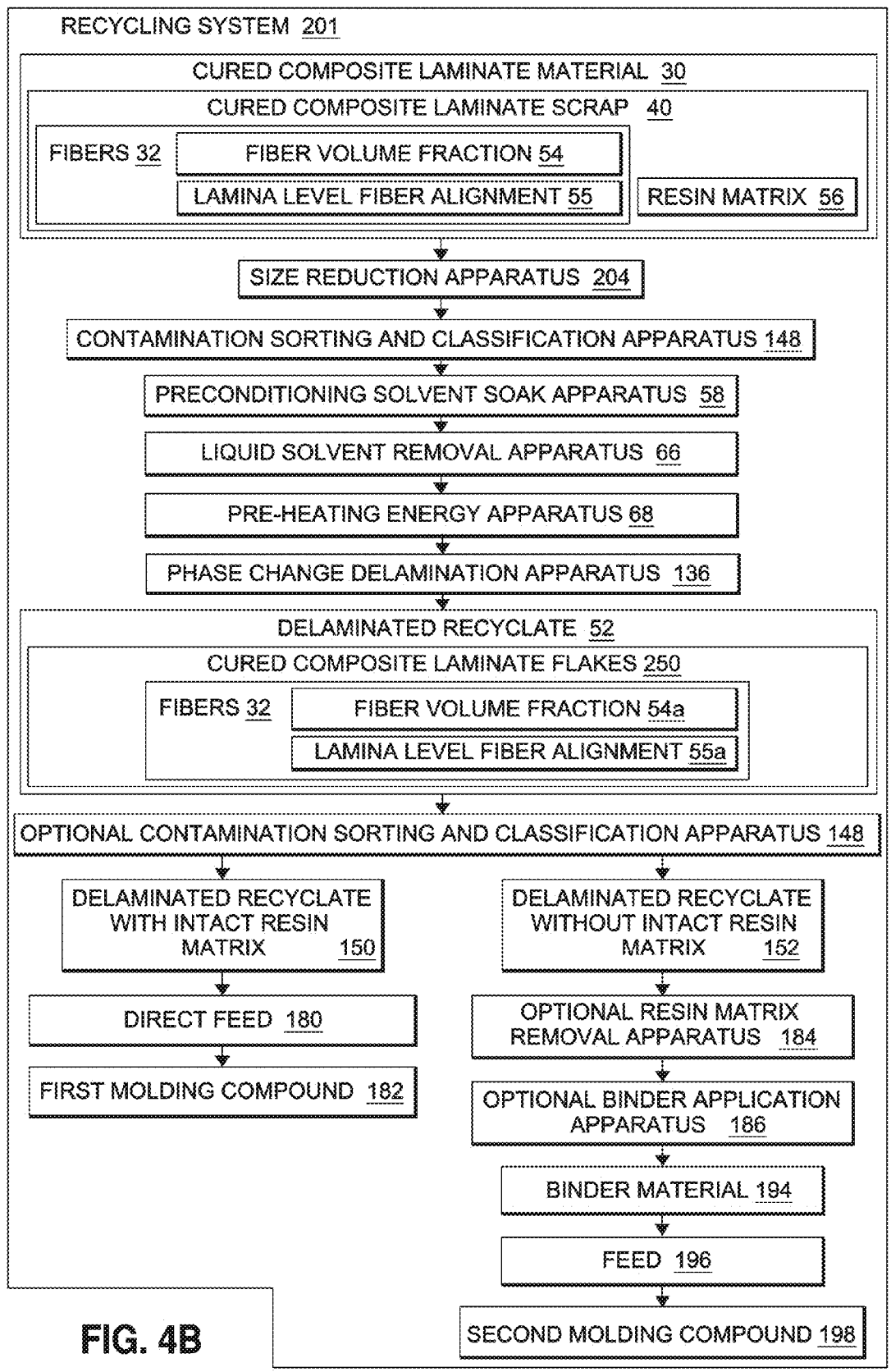
FIG. 4B is an illustration of a block diagram of another one of the embodiments of a system for recycling a cured composite laminate material into a delaminated recyclate of the disclosure.

FIG. 4B is an illustration of a block diagram of another one of the embodiments of a recycling system 201 for recycling a cured composite laminate material 30, preferably in the form of cured composite laminate scrap 40, into a delaminated recyclate 52, preferably in the form of cured composite laminate flakes 250. The recycling system 201 shown in FIG. 4B comprises the same elements as the recycling system 200 of FIG. 4A and may further comprise additional elements. As shown in FIG. 4B, the recycling system 201 comprises the cured composite laminate material 30, preferably in the form of cured composite laminate scrap 40. The cured composite laminate scrap 40 comprises the plurality of fibers 32 having a fiber volume fraction 54 and a lamina level fiber alignment 55. The cured composite laminate scrap 40 further comprises a resin matrix 56. The recycling system 201 further comprises the size reduction apparatus 204, a contamination sorting and classification apparatus 148 which may be used twice in this embodiment, the preconditioning solvent soak apparatus 58, the liquid solvent removal apparatus 66, the pre-heating energy apparatus 68, and the phase change delamination apparatus 136. The phase change delamination apparatus 136 rapidly heats with a rapid heating energy 138 (see FIG. 5) via a phase change delamination process 142 (see FIG. 5) the pre-heated cured composite laminate material 30 substantially to a temperature above a highest solvent boiling point of the one or more liquid solvents 60, so as to effect a solvent liquid-to-gas phase change 140 (see FIG. 5) of the one or more liquid solvents 60 in order to delaminate the cured composite laminate material 30 to obtain a delaminated recyclate 52. Preferably, the delaminated recyclate 52 is in the form of cured composite laminate flakes 205 (see FIG. 4B). The cured composite laminate flakes 205 maintains a fiber volume fraction 54a and a lamina level fiber alignment 55a of the plurality of fibers 32 where the fiber volume fraction 54a and the lamina level fiber alignment 55a are substantially the same as a fiber volume fraction 54 and a lamina level fiber alignment 55 of the plurality of fibers 32 of the cured composite laminate material 30.

As shown in FIG. 4B, the recycling system 201 further comprises the contamination sorting and classification apparatus 148 which is used with the delaminated recyclate 52. As shown in FIG. 4B, the delaminated recyclate with the intact resin matrix 150 may be used as a direct feed 180 for a first molding compound 182. Alternatively, the delaminated recyclate without the intact resin 152 may be further processed and may further comprise the resin matrix removal apparatus 184 and the binder application apparatus 186. The resin matrix removal apparatus 184 removes the resin matrix 56 from the delaminated recyclate without the intact resin 152. The binder application apparatus 186 applies the binder material 194 to the plurality of fibers 32 in order to keep the fibers 32 intact. The delaminated recyclate 52 with the binder material 194 may then be used as feed 196 for the second molding compound 198.

Figure 11:
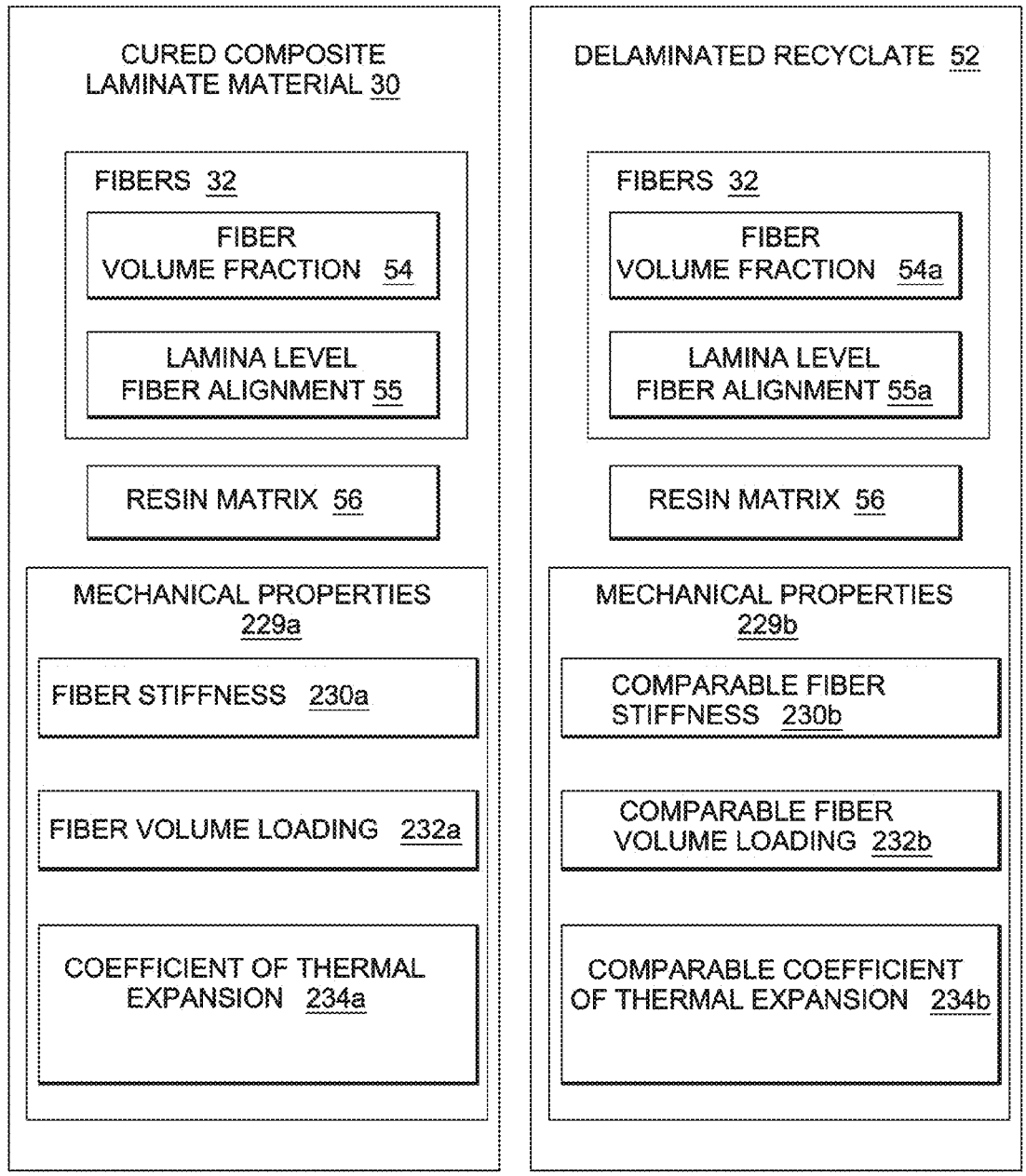
FIG. 11 is an illustration of a block diagram comparing mechanical properties of cured composite laminate material and delaminated recyclate recycled with embodiments of the disclosed methods and systems of the disclosure.

FIG. 11 is an illustration of a block diagram comparing mechanical properties 229a of original, non-recycled, cured composite laminate material 30 and mechanical properties 229b of delaminated recyclate 52 recycled with embodiments of the disclosed methods and systems of the disclosure. Preferably, the delaminated recyclate 52 has a fiber stiffness 230b, a fiber volume loading 232b, and a coefficient of thermal expansion 234b all comparable to a fiber stiffness 230a, a fiber volume loading 232a, and a coefficient of thermal expansion 234a of the cured composite laminate material 30. Preferably, as shown in FIG. 11, the delaminated recyclate 52 has a fiber stiffness 230b, a fiber volume loading 232b, and a coefficient of thermal expansion 234b all comparable to a fiber stiffness 230a, a fiber volume loading 232a, and a coefficient of thermal expansion 234a of the cured composite laminate material 30.

Figure 5:
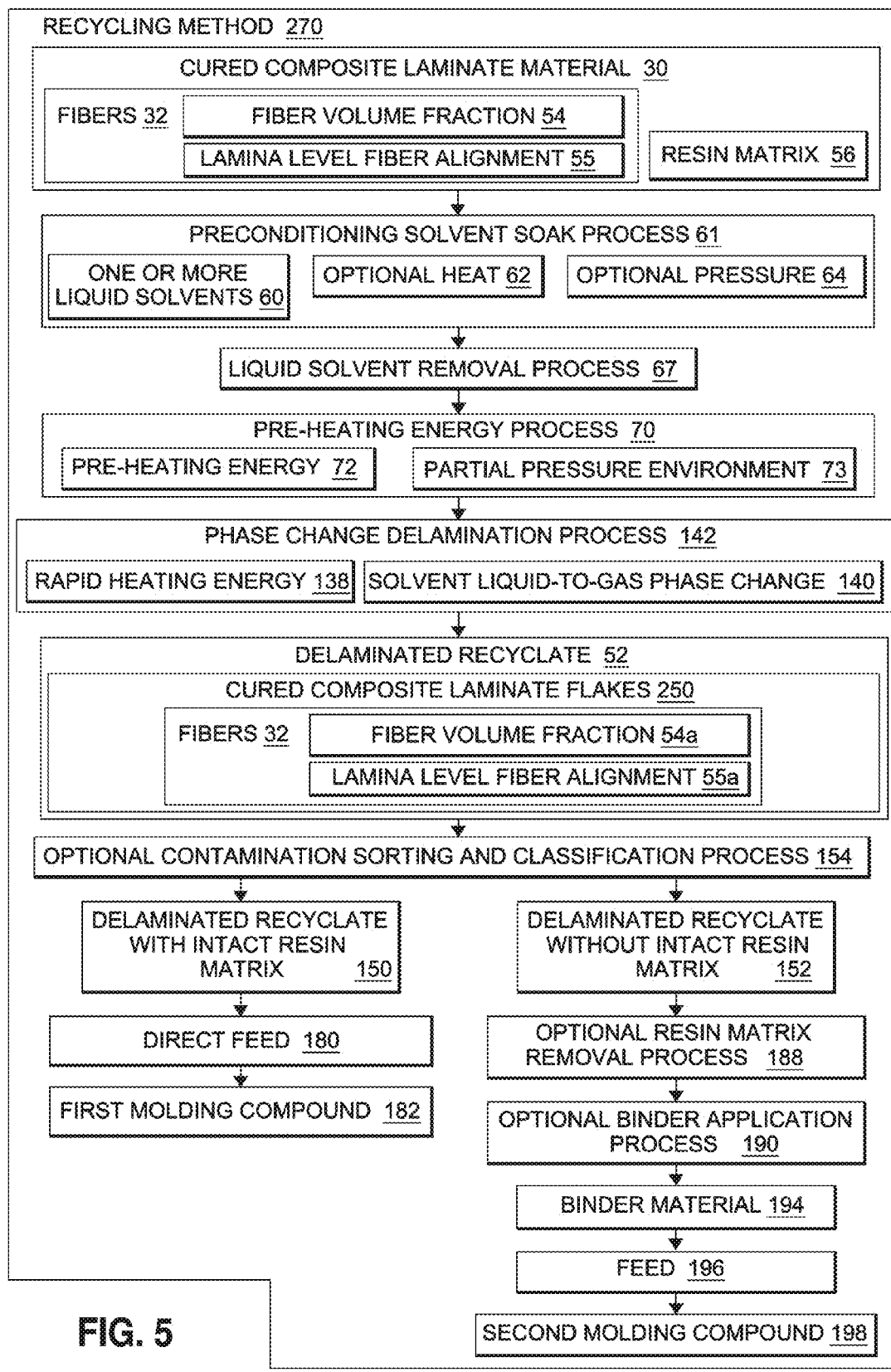
FIG. 5 is an illustration of a block diagram of one of the embodiments of a method for recycling a cured composite laminate material into a delaminated recyclate of the disclosure.

In another embodiment of the disclosure, there is provided a recycling method 270. FIG. 5 is an illustration of a block diagram of one of the embodiments of the recycling method 270 for recycling a cured composite laminate material 30 into a delaminated recyclate 52 of the disclosure. FIG. 5 shows the cured composite laminate material 30 with fibers 32 having a fiber volume fraction 54 and a lamina level fiber alignment 55, and the cured composite laminate material 30 further comprises a resin matrix 56. The cured composite laminate material 30 undergoes the preconditioning solvent soak process 61 with one or more liquid solvents 60, optional heat 62, and optional pressure 65. The cured composite laminate material 30 then undergoes the liquid solvent removal process 67. The cured composite laminate material 30 then undergoes the pre-heating energy process 68 with a pre-heating energy 70, as discussed above and shown in FIG. 8, and a partial pressure environment 73. The cured composite laminate material 30 then undergoes the phase change delamination process 142 with rapid heating energy 138, as discussed above and shown in FIG. 9, where the one or more liquid solvents 60 undergo a solvent liquid-to-gas phase change 140. The resulting delaminated recyclate 52 may be in the form of cured composite laminate flakes 250 having fibers 32 with a fiber volume fraction 54a and a lamina level fiber alignment 55a of the plurality of fibers 32 where the fiber volume fraction 54a and the lamina level fiber alignment 55a are substantially the same as a fiber volume fraction 54 and a lamina level fiber alignment 55 of the cured composite laminate material 30 that has been recycled. The resulting delaminated recyclate 52 then undergoes the contamination sorting and classification processes 154, discussed in detail above and shown in FIG. 10.

As shown in FIG. 5, the delaminated recyclate with the intact resin matrix 150 may be used as a direct feed 180 for the first molding compound 182. Alternatively, the delaminated recyclate without the intact resin 152 may be further processed, and the recycling method 270 further comprises a resin matrix removal process 188 and a binder application process 190. The resin matrix removal process 188 removes the resin matrix 56 from the delaminated recyclate without the intact resin 152. The resin matrix removal process 188 may comprise known pyrolysis processes to remove the resin matrix 56 or may comprise another suitable resin matrix removal process. The binder application process 190 applies a binder material 194 to the plurality of fibers 32 in order to keep the fibers 32 intact. The delaminated recyclate 52 with the binder material 194 may then be used as feed 196 for a second molding compound 198.

In another embodiment of the disclosure, there is provided a recycling method 280. FIG. 6 is an illustration of a block diagram of one of the embodiments of the recycling method 280 for recycling a cured composite laminate scrap 40 into a delaminated recyclate 52, preferably in the form of cured composite laminate flakes 250. FIG. 6 shows the cured composite laminate scrap 40 with fibers 32 having a fiber volume fraction 54 and a lamina level fiber alignment 55 and the cured composite laminate scrap 40 further having a resin matrix 56. The cured composite laminate scrap 40 first undergoes the size reduction process 202, as discussed in detail above and shown in FIG. 7. The cured composite laminate scrap 40 then undergoes the contamination sorting and classification process 154, as discussed in detail above and shown in FIG. 10. The cured composite laminate scrap 40 then undergoes the preconditioning solvent soak process 61 with one or more liquid solvents 60, optional heat 62, and optional pressure 65. The cured composite laminate scrap 40 then undergoes the liquid solvent removal process 67. The cured composite laminate scrap 40 then undergoes the pre-heating energy process 70 with a pre-heating energy 72, as discussed above and shown in FIG. 8, and in a partial pressure environment 73. The cured composite laminate scrap 40 then undergoes the phase change delamination process 142 with rapid heating energy 138, as discussed above and shown in FIG. 9, where the one or more liquid solvents 60 undergo a solvent liquid-to-gas phase change 140. The resulting delaminated recyclate 52 may preferably be in the form of cured composite laminate flakes 250 having fibers 32 with a fiber volume fraction 54a and a lamina level fiber alignment 55a substantially the same as a fiber volume fraction 54 and a lamina level fiber alignment 55 of the fibers 32 of the cured composite laminate scrap 40 that has been recycled. The resulting delaminated recyclate 52 then undergoes the contamination sorting and classification processes 154, discussed in detail above and as shown in FIG. 10.

As shown in FIG. 6, the delaminated recyclate with the intact resin matrix 150 may be used as a direct feed 180 for the first molding compound 182. Alternatively, the delaminated recyclate without the intact resin 152 may be further processed, and the recycling method 280 may further comprise a resin matrix removal process 188 and a binder application process 190. The resin matrix removal process 188 removes the resin matrix 56 from the delaminated recyclate without the intact resin 152. The resin matrix removal process 188 may comprise known pyrolysis processes to remove the resin matrix 56 or may comprise another suitable resin matrix removal process. The binder application process 190 applies a binder material 194 to the plurality of fibers 32 in order to keep the fibers 32 intact. The delaminated recyclate 52 with the binder material 194 may then be used as feed 196 for the second molding compound 198.

Figure 12:
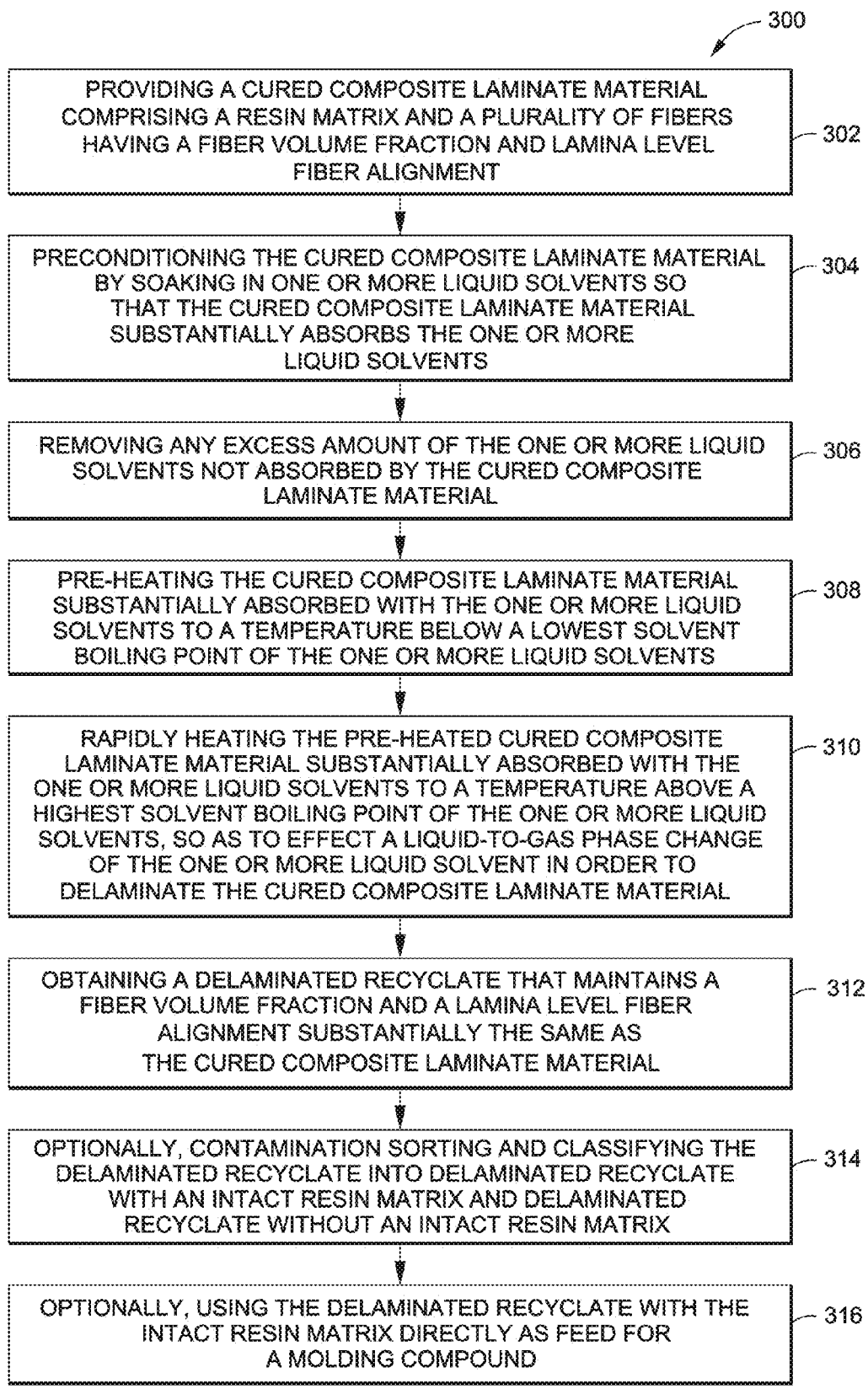
FIG. 12 is an illustration of a flow diagram of an exemplary embodiment of a method of the disclosure.

In another embodiment of the disclosure, there is provided a recycling method 300. FIG. 12 is an illustration of a flow diagram of an exemplary embodiment of the recycling method 300 of the disclosure. As shown in FIG. 12, in an embodiment of the disclosure, there is provided a recycling method 300 for recycling a cured composite laminate material 30 (see FIG. 5) into a delaminated recyclate 52 (see FIG. 5) that maintains a fiber volume fraction 54a and a lamina level fiber alignment 55a substantially the same as a fiber volume fraction 54 and a lamina level fiber alignment 55 of the fibers 32 of the cured composite laminate material 52. The recycling method 300 comprises step 302 of providing a cured composite laminate material 30 comprising a resin matrix 56 and a plurality of fibers 32 having a fiber volume fraction 54 and a lamina level fiber alignment 55. Preferably, the cured composite laminate material 30 is a cured composite laminate comprising manufacturing scrap, end-of-life scrap, trimmings, chips, cut-offs, tooling, unused material, scrapped components, out of date components, or other suitable cured composite laminate material 30 to be recycled.

The recycling method 300 further comprises step 304 of preconditioning the cured composite laminate material 30 by soaking it in one or more liquid solvents 60 (see FIG. 5) so that the cured composite laminate material 30 substantially absorbs the one or more liquid solvents 60. The recycling method 300 further comprises step 306 of removing any excess amount of the one or more liquid solvents 60 not absorbed by the cured composite laminate material 30.

The recycling method 300 further comprises step 308 of pre-heating the cured composite laminate material 30 substantially absorbed with the one or more liquid solvents 60 to a temperature below a lowest solvent boiling point of the one or more liquid solvents 60. The pre-heating step is preferably conducted in a partial pressure environment 73 (see FIG. 5) that is preferably at a high partial pressure, with a pre-heating energy 72 (see FIG. 5) comprising a thermal energy 76 (see FIG. 8) comprising a conduction energy 82 (see FIG. 8), a convection energy 90 (see FIG. 8), or an infrared energy 98 (see FIG. 8); a microwave energy 106 (see FIG. 8); an induction energy 114 (see FIG. 8); an acoustic energy 122 (see FIG. 8) comprising an ultrasonic energy 128 (see FIG. 8), or another suitable pre-heating energy.

The recycling method 300 further comprises step 310 of rapidly heating the pre-heated cured composite laminate material 30 substantially absorbed with the one or more liquid solvents 60 to a temperature above a highest solvent boiling point of the one or more liquid solvents 60, so as to effect a solvent liquid-to-gas phase change 140 (see FIG. 5) of the one or more liquid solvents 60 in order to delaminate the cured composite laminate material 30. The rapidly heating of the pre-heated cured composite laminate material is conducted with a heating energy 138 (see FIG. 9) comprising a thermal energy 76 (see FIG. 9) comprising a conduction energy 82 (see FIG. 9), a convection energy 90 (see FIG. 9), or an infrared energy 98 (see FIG. 9); a microwave energy 106 (see FIG. 9); an induction energy 114 (see FIG. 9); an acoustic energy 122 (see FIG. 9) comprising an ultrasonic energy 128 (see FIG. 9), or another suitable heating energy. The recycling method 300 further comprises step 312 of obtaining a delaminated recyclate 52 (see FIG. 5) that maintains a fiber volume fraction 54a and a lamina level fiber alignment 55a of the plurality of fibers 32 that is substantially the same as a fiber volume fraction 54 and a lamina level fiber alignment 55 of the plurality of fibers 32 of the cured composite laminate material 30.

The recycling method 300 further comprises optional step 314 of contamination sorting and classifying the delaminated recyclate 52 into delaminated recyclate with an intact resin matrix 150 (see FIG. 5) and delaminated recyclate without an intact resin matrix 152 (see FIG. 5). The recycling method 300 further comprises optional step 316 of using the delaminated recyclate with the intact resin matrix 150 as a direct feed 180 (see FIG. 5) for a first molding compound 182 (see FIG. 5).

The recycling method 300 may further comprise additional optional steps. For example, the recycling method 300 may comprise prior to the preconditioning step 304, the step of reducing in size the cured composite laminate material 30 via a size reduction process 202 (see FIG. 7) such as a shredding process 206, a comminution process 210, a cutting process 214, a grinding process 218, a crushing process 222, a shearing process 226 or another suitable size reduction process. The recycling method 300 may further comprise prior to the preconditioning step 304, the step of contamination sorting and classifying the cured composite laminate material 30 via a contamination sorting and classification process 154 (see FIG. 10), such as a fiber recovery flotation process 156, a density gradient process 160, an eddy current separator process 164, a magnetic separator process 168, a cyclonic separator process 172, a sieving process 176, or another suitable contamination sorting and classification process 154. The recycling method 300 may further comprise processing the delaminated recyclate without the intact resin matrix 152 by removing the resin matrix 56 from the delaminated recyclate without the intact resin matrix 152, by applying a binder material 194 (see FIG. 3B) to the plurality of fibers 32 of the delaminated recyclate without the intact resin matrix 152 in order to keep the plurality of fibers 32 intact, and using the delaminated recyclate 52 with the binder material 194 as feed 196 for a second molding compound 198 (see FIG. 3B).

Figure 13A:
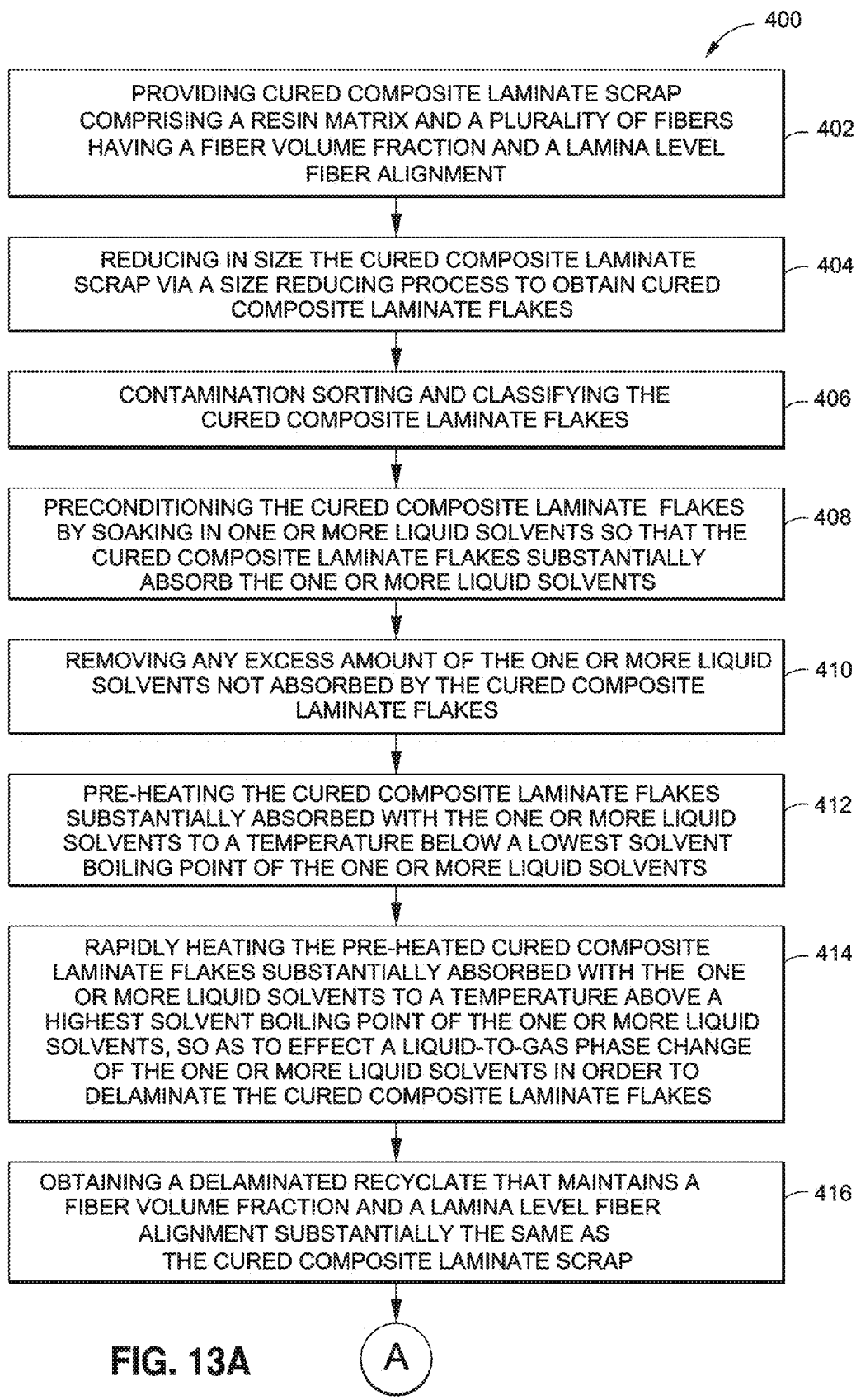
FIGS. 13A-13B are illustrations of a flow diagram of another exemplary embodiment of a method of the disclosure.
Figure 13B:
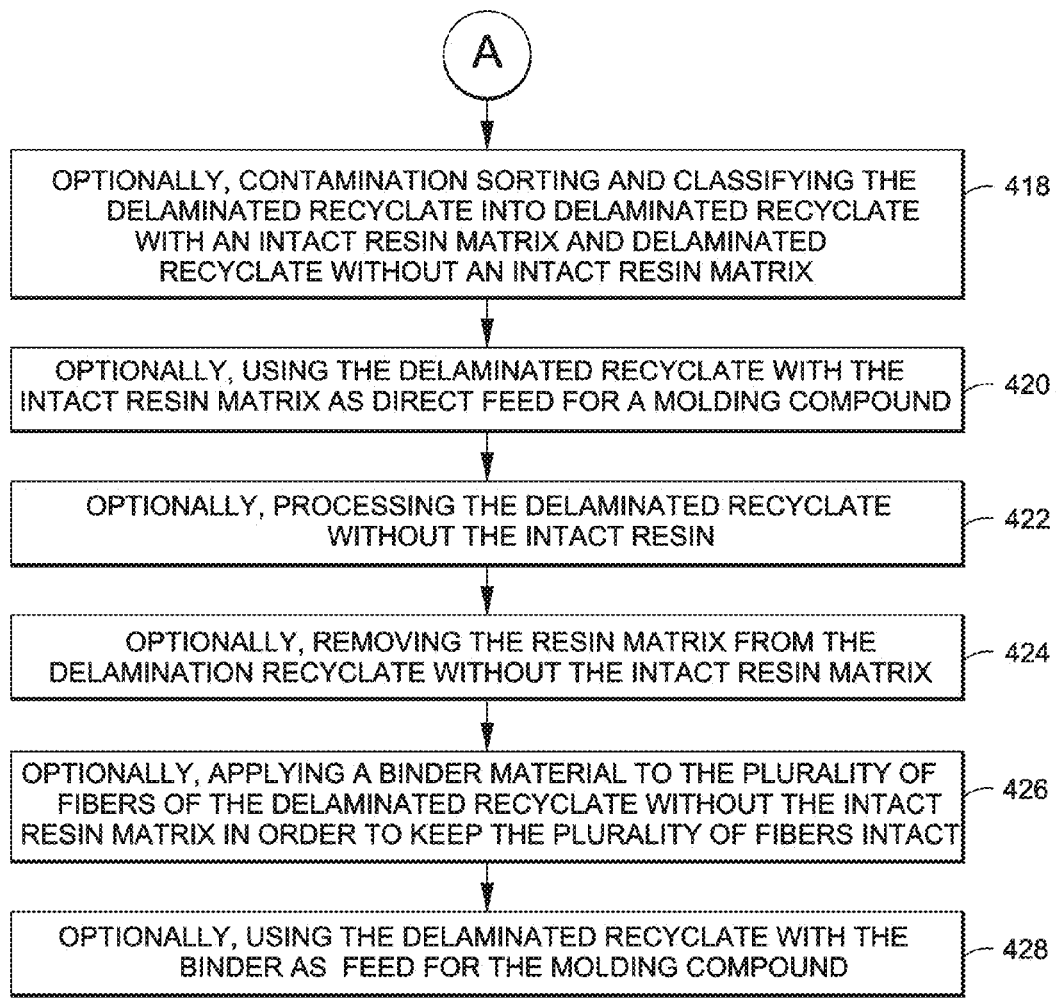

In another embodiment of the disclosure, there is provided a recycling method 400. FIGS. 13A-13B are illustrations of a flow diagram of another exemplary embodiment of the recycling method 400 of the disclosure. As shown in FIGS. 13A-13B, there is provided the recycling method 400 for recycling cured composite laminate scrap 40 (see FIG. 6) into delaminated recyclate 52 that maintains a fiber volume fraction 54a and a lamina level fiber alignment 55a substantially the same as a fiber volume fraction 54 and a lamina level fiber alignment 55 of the cured composite laminate scrap 40. As shown in FIG. 13A, the recycling method 400 comprises step 402 of providing the cured composite laminate scrap 40 comprising the resin matrix 56 and the plurality of fibers 32 having a fiber volume fraction 54 and a lamina level fiber alignment 55.

As shown in FIG. 13A, the recycling method 400 further comprises step 404 of reducing in size the cured composite laminate scrap 40 via a size reduction process 202 (see FIG. 6) to obtain cured composite laminate flakes 250 (see FIG. 6). The recycling method 400 further comprises step 406 of contamination sorting and classifying the cured composite laminate flakes 250. As shown in FIG. 13A, the recycling method 400 further comprises step 408 of preconditioning the cured composite laminate flakes 250 by soaking them in one or more liquid solvents 60 (see FIG. 6) so that the cured composite laminate flakes 250 substantially absorb the one or more liquid solvents 60. As shown in FIG. 13A, the recycling method 400 further comprises step 410 of removing any excess amount of the one or more liquid solvents 60 not absorbed by the cured composite laminate flakes 250. As shown in FIG. 13A, the recycling method further comprises step 412 of pre-heating the cured composite laminate flakes 250 substantially absorbed with the one or more liquid solvents 60 to a temperature below a lowest solvent boiling point of the one or more liquid solvents 60. The pre-heating energy process 70 (see FIG. 6) is discussed in detail above and shown in FIG. 8.

As shown in FIG. 13A, the recycling method 400 further comprises step 414 of rapidly heating the pre-heated cured composite laminate flakes 250 substantially absorbed with the one or more liquid solvents 60 to a temperature above a highest solvent boiling point of the one or more liquid solvents, so as to effect a solvent liquid-to-gas phase change 140 (see FIG. 6) of the one or more liquid solvents 60 in order to delaminate the cured composite laminate flakes 250. The rapidly heating step 414 preferably comprises the phase change delamination process 142 discussed in detail above and shown in FIG. 9.

As shown in FIG. 13A, the recycling method 400 further comprises step 416 of obtaining delaminated recyclate 52 (see FIG. 6) that maintains a fiber volume fraction 54a and a lamina level fiber alignment 55a of the plurality of fibers 32 that are substantially the same as the fiber volume fraction 54 and the lamina level fiber alignment 55 of the plurality of fibers 32 of the cured composite laminate scrap 40.

As shown in FIG. 13B, the recycling method 400 may further comprise optional step 418 of contamination sorting and classifying the delaminated recyclate 52 into delaminated recyclate with an intact resin matrix 150 (see FIG. 6) and delaminated recyclate without an intact resin matrix 152 (see FIG. 6).

As shown in FIG. 13B, the recycling method 400 may further comprise optional step 420 of using the delaminated recyclate with the intact resin matrix 150 as a direct feed 180 (see FIG. 6) for a first molding compound 182 (see FIG. 6). As shown in FIG. 13B, the recycling method 400 may further comprise optional step 422 of processing the delaminated recyclate without the intact resin matrix 152 with optional steps comprising: step 424 of removing the resin matrix 56 from the delaminated recyclate without the intact resin matrix 152, step 426 of applying a binder material 194 (see FIG. 3B) to the plurality of fibers 32 of the delaminated recyclate without the intact resin matrix 152 in order to keep the plurality of fibers 32 intact, and step 428 of using the delaminated recyclate 52 with the binder material 194 as a feed 196 (see FIG. 6) for a second molding compound 198 (see FIG. 6).

FIG. 14 is an illustration of a schematic diagram of a summary of steps that may be used with exemplary embodiments of methods and systems of the disclosure. FIG. 14 shows the cured composite laminate scrap 40 being input and processed with a size reduction process 202. The size reduction process 202 preferably uses a size reduction apparatus 204 discussed above and shown in FIG. 7. The cured composite laminate scrap 40 that is reduced in size then proceeds to a contamination sorting and classification process 154. As shown in FIG. 14, the contamination sorting and classification process 154 may produce fines for milled fiber recovery 262, waste 264, valuable metallic materials 266, or other suitable products. The contamination sorting and classification process 154 preferably uses a contamination sorting and classification apparatus 148 discussed above and shown in FIG. 10. The reduced and sorted cured composite laminate scrap 40 then undergoes the preconditioning solvent soak process 61. The preconditioning solvent soak process 61 preferably uses a preconditioning solvent soak apparatus 58 (see FIG. 4B) discussed above. The reduced, sorted, and preconditioned cured composite laminate scrap 40 then undergoes the liquid solvent removal process 67. The liquid solvent removal process 67 preferably uses a liquid solvent removal apparatus 66 (see FIG. 4B) discussed above. After the liquid solvent removal process 67, the reduced, sorted, preconditioned, and excess solvent removed cured composite laminate scrap 40 may return to the preconditioning solvent soak process 61 to be additionally soaked or may proceed to the pre-heating energy process 70. The pre-heating energy process 70 preferably uses a pre-heating energy apparatus 68 discussed above and shown in FIG. 8. The reduced, sorted, preconditioned, excess solvent removed, and pre-heated cured composite laminate scrap 40 then undergoes the phase change delamination process 142. The phase change delamination process 142 preferably uses a phase change delamination apparatus 136 discussed above and shown in FIG. 9. As shown in FIG. 14, the resulting product then undergoes the contamination sorting and classification process 154. Delaminated recyclate with intact resin matrix 150 may be used as direct feed 180, such as in the form of single lamina thick composite flakes with intact resin matrix 268. Alternatively, delaminated recyclate without the intact resin matrix 152 undergoes the resin matrix removal process 188 and the binder application process 190 to be used as feed 196, such as in the form of single lamina thick composite fiber flakes 269.

Figure 15:
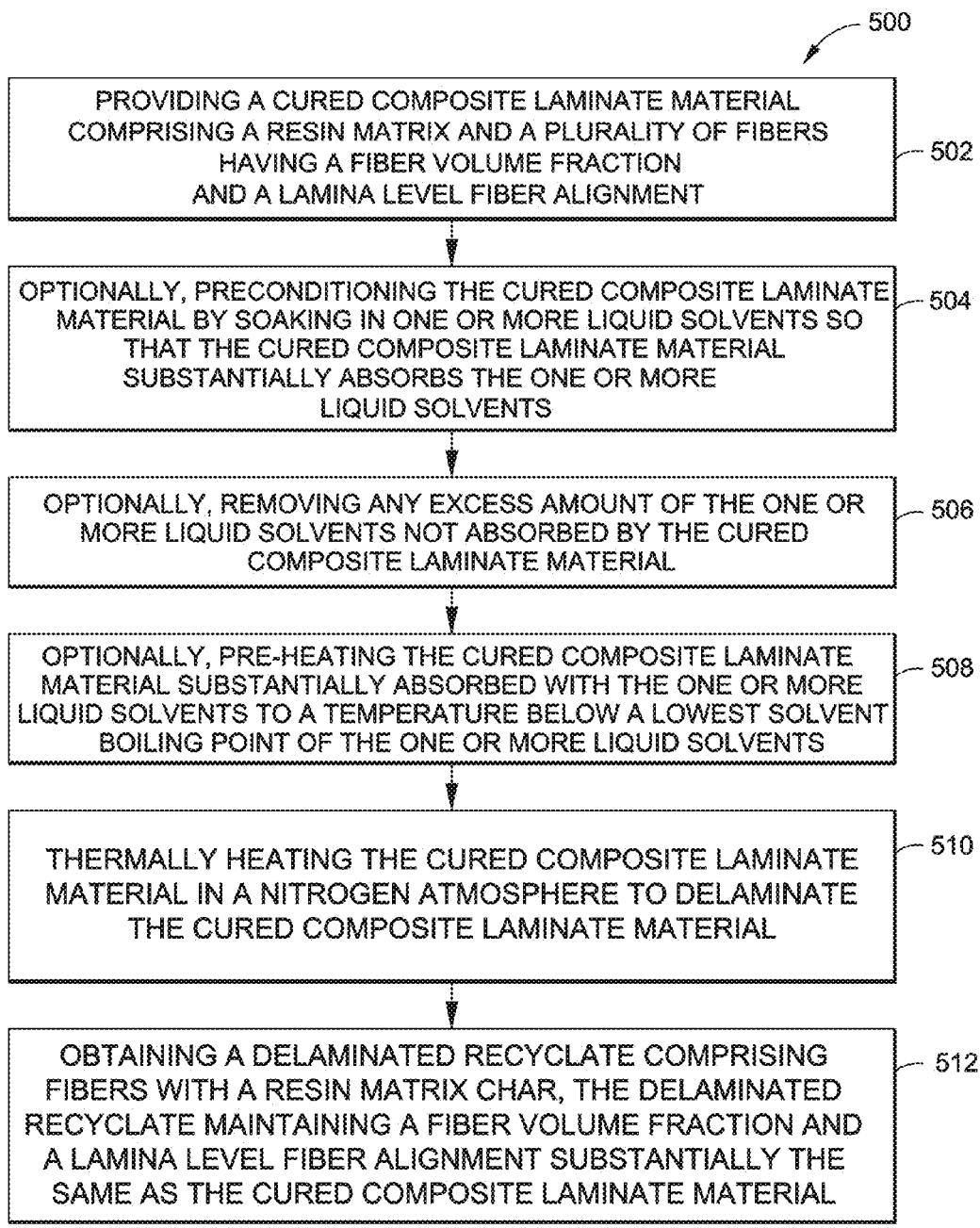
FIG. 15 is an illustration of a flow diagram of another exemplary embodiment of a method of the disclosure.

FIG. 15 is an illustration of a flow diagram of another exemplary embodiment of a method 500 of the disclosure. In this embodiment, there is provided the method 500 for recycling a cured composite laminate material 30 into a delaminated recyclate 52 that maintains a fiber volume fraction 54a and a lamina level fiber alignment 55a that are substantially the same as the fiber volume fraction 54 and the lamina level fiber alignment 55 of the cured composite laminate material 30. The method 500 comprises step 502 of providing a cured composite laminate material 30 comprising a resin matrix 56 and a plurality of fibers 32 having a fiber volume fraction 54 and a lamina level fiber alignment 55. The method 500 may further comprise optional step 504 of preconditioning the cured composite laminate material 30 by soaking in one or more liquid solvents 60, so that the cured composite laminate material 30 substantially absorbs the one or more liquid solvents 60. The method 500 may further comprise optional step 506 of removing any excess amount of the one or more liquid solvents not absorbed by the cured composite laminate material 30. The method 500 may further comprise optional step 508 of pre-heating the cured composite laminate material 30 substantially absorbed with the one or more liquid solvents 60 to a temperature below a lowest solvent boiling point of the one or more liquid solvents.

The method 500 further comprises step 510 of thermally heating the cured composite laminate material 30 in a nitrogen atmosphere or environment to delaminate the cured composite laminate material 30. Preferably, the cured composite laminate material 30 is heated via controlled pyrolysis in a heating apparatus such as an oven in a nitrogen atmosphere or environment. Preferably, the cured composite laminate material 30 is heated at a temperature of greater than about 500 degrees Fahrenheit and for a time of about an hour. However, the heating temperature and heating time depend on the type of cured composite laminate material 30 being thermally heated. After the cured composite laminate material 30 is sufficiently heated in the nitrogen atmosphere to effect delamination of the cured composite laminate material into individual lamina, the method 500 further comprises step 512 of obtaining a delaminated recyclate 52a comprising fibers 32 with a resin matrix char 604 (see FIG. 16). The delaminated recyclate 52a maintains a fiber volume fraction 54a and a lamina level fiber alignment 55a of the fibers 32 that are substantially the same as the fiber volume fraction 54 and the lamina level fiber alignment 55 of the plurality of fibers 32 of the cured composite laminate material 30.

Once the delaminated recyclate 52a is obtained, it may then optionally be consolidated with a new resin matrix 608 (see FIG. 16) with a new resin matrix application apparatus 606 via a known consolidation process. The delaminated recyclate 52a with the new resin matrix 608 may then be made into a structure 610 (see FIG. 16), for example, a panel or a composite part. Alternatively, once the delaminated recyclate 52a is obtained, it may then optionally be consolidated with a binder material 194 (see FIG. 16) via a binder application apparatus 186 via a known consolidation process. The delaminated recyclate 52a with the binder material 194 may then be used as feed 196 and made into a second molding compound 198 as discussed above.

Figure 16:
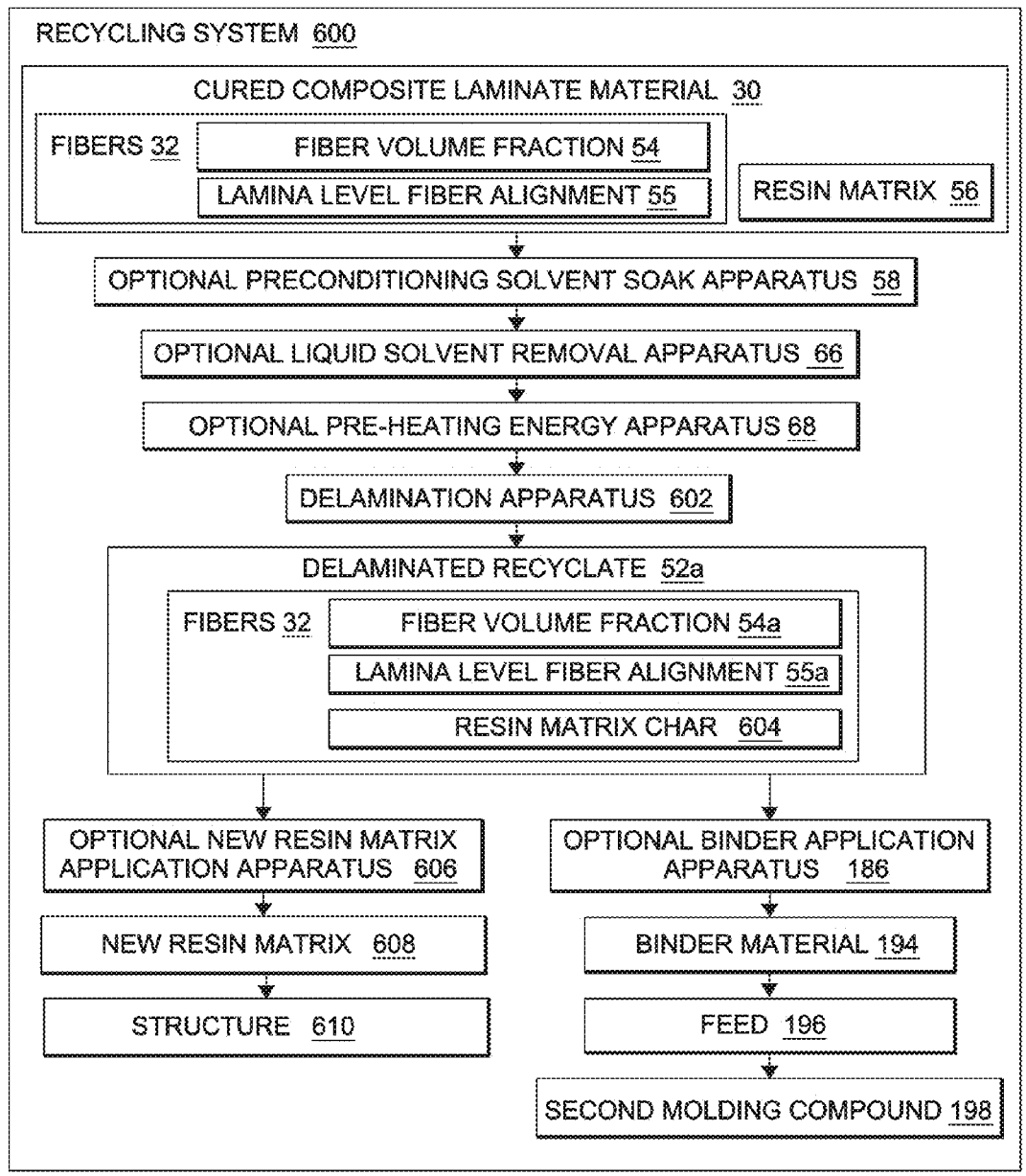
FIG. 16 is an illustration of a block diagram of another one of the embodiments of a system for recycling a cured composite laminate material into a delaminated recyclate of the disclosure; and, FIGS. 17A-17B show micrograph photographs of cross sections of a cured composite laminate incorporating delaminated recyclate lamina flakes.

FIG. 16 is an illustration of a block diagram of another one of the embodiments of a recycling system 600 for recycling a cured composite laminate material 30 into a delaminated recyclate 52a that maintains a fiber volume fraction 54a and a lamina level fiber alignment 55a that are substantially the same as the fiber volume fraction 54 and the lamina level fiber alignment 55 of the cured composite laminate material 30. As shown in FIG. 16, the recycling system 600 comprises a cured composite laminate material 30 comprising a resin matrix 56 and a plurality of fibers 32 having a fiber volume fraction 54 and a lamina level fiber alignment 55. Preferably, the lamina level fiber alignment is in the form of the continuous, aligned fiber orientation 34 (see FIG. 2A). The cured composite laminate material 30 may comprise manufacturing scrap, end-of-life scrap, trimmings, chips, cut-offs, tooling, unused material, scrapped components, out of date components, or other suitable cured composite laminate material 30 to be recycled.

As shown in FIG. 16, the recycling system 600 may further optionally comprise a preconditioning solvent soak apparatus 58 containing one or more liquid solvents 60 (see FIG. 5) for soaking via a preconditioning solvent soak process 61 (see FIG. 5) the cured composite laminate material 30, so that the cured composite laminate material 30 substantially absorbs the one or more liquid solvents 60. The one or more liquid solvents 60 may comprise water, benzyl alcohol, acetone, methyl ethyl ketone (MEK), hydrochloric acid, a combination of one or more thereof, or another suitable liquid solvent. The preconditioning solvent soak apparatus 58 may comprise an open or closed container or vessel. Optionally, the preconditioning solvent soak process 61 may be conducted with heat 62 (see FIG. 5), pressure 64 (see FIG. 5), or a combination of heat 62 and pressure 64.

As shown in FIG. 16, the recycling system 600 may further optionally comprise a liquid solvent removal apparatus 66 to remove via a liquid solvent removal process 67 (see FIG. 5) any excess amount of the one or more liquid solvents 60 not absorbed by the cured composite laminate material 30. The liquid solvent removal process 67 may comprise evaporation by exposure to air or another suitable evaporation process.

As shown in FIG. 16, the recycling system 600 may further optionally comprise a pre-heating energy apparatus 68 for pre-heating the cured composite laminate material 30 to a temperature below a lowest solvent boiling point of the one or more liquid solvents 60. The pre-heating energy apparatus 68 and pre-heating energy process 70 are discussed in detail above and shown in FIG. 8.

As shown in FIG. 16, the recycling system 600 further comprises a delamination apparatus 602 for thermally heating the cured composite laminate material 30 in a nitrogen atmosphere or environment to delaminate the cured composite laminate material 30. Preferably, the delamination apparatus 602 is a pyrolysis apparatus that is capable of heating the cured composite laminate material 30 in a nitrogen atmosphere preferably at a temperature above 500 degrees Fahrenheit. As shown in FIG. 16, once the cured composite laminate material 30 is delaminated via the delamination apparatus 602, the delaminated recyclate 52a is obtained. The delaminated recyclate 52a obtained or produced comprises fibers 32 having resin matrix char 604. The delaminated recyclate 52a maintains a fiber volume fraction 54a and a lamina level fiber alignment 55a of the fibers 32 that are substantially the same as the fiber volume fraction 54 and the lamina level fiber alignment 55 of the fibers 32 of the cured composite laminate material 30.

The method 500 and recycling system 600 may preferably use a controlled pyrolysis process to separate the cured composite laminate material 30. The time, the temperature and the partial pressure environment 73 (see FIG. 5) may be controlled to preferentially pyrolize the resin matrix 56 in between the lamina layers 33 (see FIG. 2A) leaving a minimal amount of resin matrix 56 and/or resin matrix char 602 (see FIG. 16) intact, while still preserving the cohesiveness of the delaminated recyclate 52a, which may be in the form of cured composite laminate flakes 250 (see FIG. 4B). Further, the controlled pyrolysis preferably maintains or preserves a fiber volume fraction 54a and a lamina level fiber alignment 55a of the fibers 32 that are substantially the same as the fiber volume fraction 54 and the lamina level fiber alignment 55 of the fibers 32 of the cured composite laminate material 30.

Optionally, the method 500 and the recycling system 600 may further comprise a size reduction process 202 (see FIG. 6) using a size reduction apparatus 204 (see FIG. 4B) for use prior to use of the preconditioning solvent soak apparatus 58. Optionally, the method 500 and the recycling system 600 may further comprise a contamination sorting and classification process 154 (see FIG. 6) using a contamination sorting and classification apparatus 148 (see FIG. 4B) for use prior to use of the preconditioning solvent soak apparatus 58.

Elastic Modulus Tests. Elastic modulus tests were conducted on a cured composite laminate incorporation delaminated recyclate lamina flakes obtained by the method 500 and using the recycling system 600. For purposes of this application, elastic modulus or tensile modulus tests were conducted to measure a stiffness of the cured composite laminate incorporating delaminated recyclate lamina flakes in a polymer resin matrix. The delaminated recyclate in the form of lamina flakes were obtained by heating shredded cured carbon composite laminate material with a controlled pyrolysis process in a conduction oven having a substantially pure nitrogen atmosphere or environment at a temperature of 500 degrees Fahrenheit for a time of about one (1) hour. After sufficient heating and pyrolysis, the resulting flake material was cooled and a polymer resin matrix was added to the delaminated flakes via a consolidation process. Sufficient heat and sufficient pressure were applied to the resin and recovered flake material to form a consolidated composite panel. Three coupons were cut from the panel having the cured composite laminate flakes in the polymer resin matrix. The coupons were tested in tension with a uniaxial load frame incorporating a load cell and extensometer measuring applied load and strain, respectively, while loading the test coupons at a rate of 0.05 inches of tension displacement per minute. The elastic modulus was the calculated in units of gigapascals (GPa) for each of the three coupons. Coupon number 1 had an elastic modulus of 42 GPa. Coupon number 2 had an elastic modulus of 41 GPa. Coupon number 3 had an elastic modulus of 29 GPa. The average elastic modulus over the coupon numbers 1, 2 and 3 was 37.3 GPa.

Figure 17A:
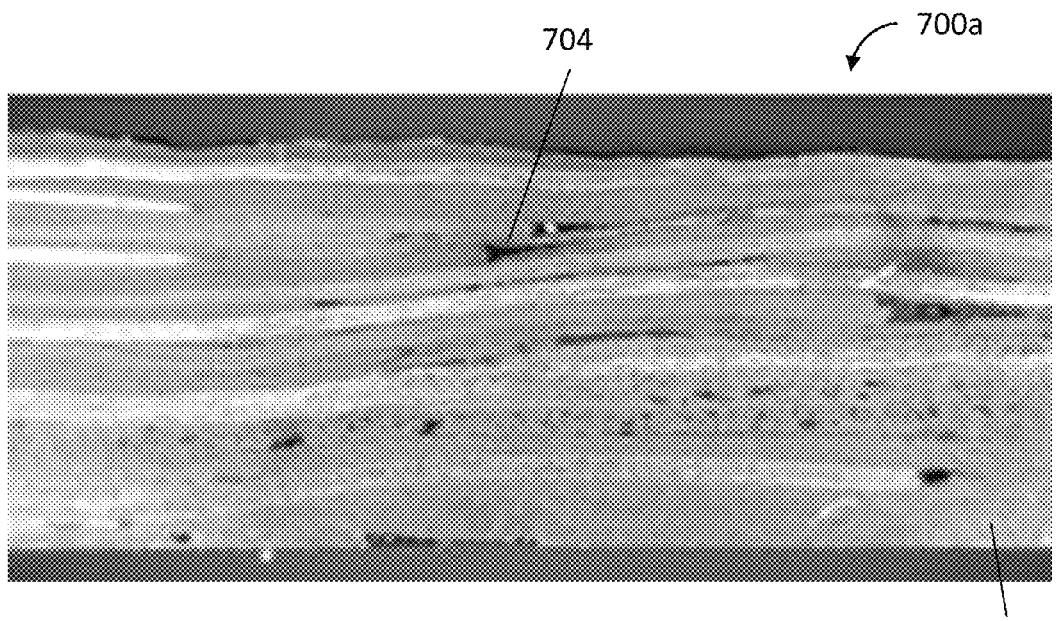
Figure 17B:
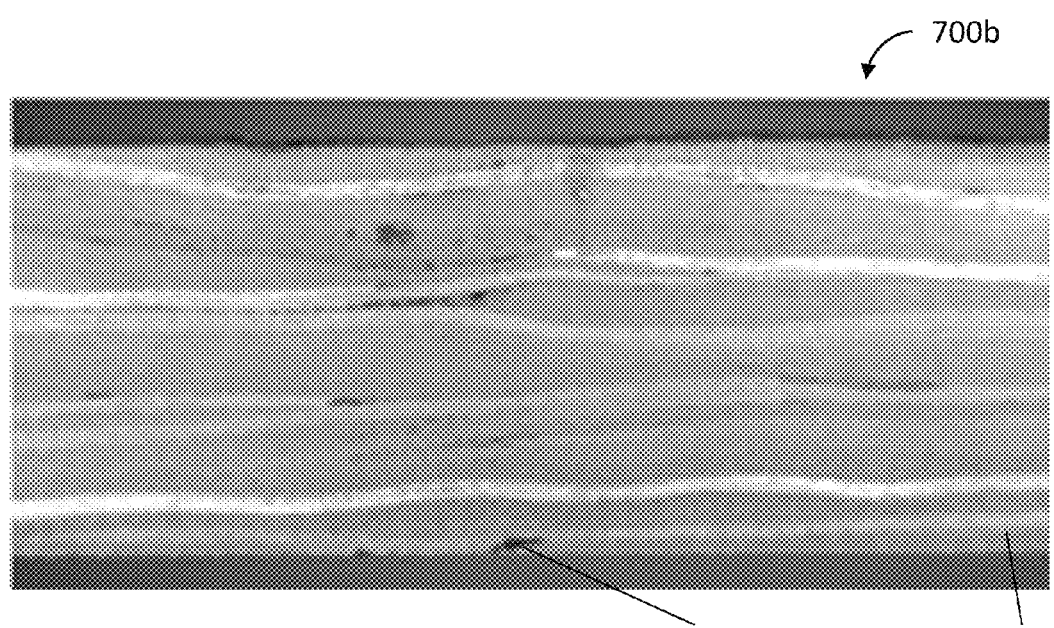

FIGS. 17A-17B show micrograph photographs of cross sections of a cured composite laminate incorporating delaminated recyclate lamina flakes from a separate coupon taken from the same panel used for coupon numbers 1, 2 and 3 for the above discussed elastic modulus tests. FIG. 17A shows a first micrograph photograph cross section 700a of delaminated recyclate lamina flakes incorporated into a polymer matrix cured composite laminate 702 taken from a coupon of a panel. The porosity areas 704 shown in the first micrograph photograph cross section 700a are low in number. FIG. 17B shows a second micrograph photograph cross section 700b of delaminated recyclate lamina flakes incorporated into a polymer matrix cured composite laminate 702 taken from the same coupon of the panel as for FIG. 17A. The porosity areas 704 shown in the second micrograph photograph cross section 700b are low in number. The micrograph photographs were taken with an optical microscope camera at about a 50× magnification. The resulting recyclate laminates shown in FIGS. 17A-17B are comparable visually to the non-recycled laminates from which they are recycled from and are comparable visually to known non-recycled laminates.

Embodiments of the systems 50, 51, 200, 201, 600 and methods 270, 280, 300, 400, 500 disclosed herein may efficiently separate laminated materials, wherein the laminate is treated first with a solvent (water, benzyl alcohol, or another suitable solvent) and then rapidly heated, to result in a phase change that delaminates and separates the plies of the laminated material, resulting in higher purity recyclates, and in the case of continuous fiber orientation composites, resulting in preservation of high fiber volume loading in a fiber reinforced delaminated flake form. Such delaminated materials may then be separated by known classification technologies to facilitate reclamation of oriented, higher value carbon fibers.

Further, embodiments of the systems 50, 51, 200, 201, 600 and methods 270, 280, 300, 400, 500 disclosed herein address the issue of fiber orientation in the delaminated recyclates, such as carbon fiber recyclates, by creating systems and methods for maintaining the original orientation of the fibers in cured composite laminate materials, such as chips or flakes. The resulting delaminated chips or flakes may be used to make higher value composite parts. The disclosed systems and methods maintain and preserve the original orientation of the carbon fibers to result in a higher value, more usable end product.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method for recycling a cured composite laminate material into a delaminated recyclate that maintains a fiber volume fraction and a lamina level fiber alignment substantially the same as the cured composite laminate material, the method comprising:

treating a cured composite laminate material by comprising a resin matrix and a plurality of fibers having a fiber volume fraction and a lamina level fiber alignment, by soaking in one or more liquid solvents so that the cured composite laminate material substantially absorbs the one or more liquid solvents;

removing the one or more liquid solvents not absorbed by the cured composite laminate material; and, a first heating step of heating the cured composite laminate material substantially absorbed with the one or more liquid solvents to a temperature below a lowest solvent boiling point of the one or more liquid solvents, and then a second heating step of heating more rapidly than the first heating step the cured composite laminate material substantially absorbed with the one or more liquid solvents to a temperature above a highest solvent boiling point of the one or more liquid solvents, so as to effect a liquid-to-gas phase change of the one or more liquid solvents in order to delaminate the cured composite laminate material; and, wherein the first and second heating steps result in a delaminated recyclate that maintains a fiber volume fraction and a lamina level fiber alignment substantially the same as the cured composite laminate material.

2. The method of claim 1, further comprising separating, sorting and classifying the delaminated recyclate into delaminated recyclate with an intact resin matrix and delaminated recyclate without an intact resin matrix, wherein the sorting requires sorting contaminants separated from the cured composite laminate material.

3. The method of claim 2, further comprising feeding the delaminated recyclate with the intact resin matrix to a process or an apparatus for utilizing the delaminated recyclate with the intact resin matrix.

4. The method of claim 2, further comprising processing the delaminated recyclate without the intact resin matrix with steps comprising:
removing the resin matrix from the delaminated recyclate without the intact resin matrix;
applying a binder material to the plurality of fibers of the delaminated recyclate without the intact resin matrix in order to keep the plurality of fibers intact; and,
feeding the delaminated recyclate with the binder material to a process or an appartus for utilizing the delaminated recyclate without the in intact resin matrix.

5. The method of claim 1, wherein the one or more liquid solvents is selected from the group consisting of water, benzyl alcohol, acetone, methyl ethyl ketone (MEK), hydrochloric acid, and a combination of one or more thereof.

6. The method of claim 1, wherein the preconditioning is conducted with heat, pressure, or a combination of heat and pressure.

7. A method for recycling cured composite laminate scrap into delaminated recyclate that maintains a fiber volume fraction and a lamina level fiber alignment substantially the same as the cured composite laminate scrap, the method comprising:
reducing in size the cured composite laminate scrap comprising a resin matrix and a plurality of fibers having a fiber volume fraction and a lamina level fiber alignment, via a size reduction process to obtain cured composite laminate flakes;
separating, sorting and classifying the cured composite laminate flakes, wherein the sorting requires sorting contaminants separated from the cured composite laminate scrap;
treating the cured composite laminate flakes by soaking in one or more liquid solvents so that the cured composite laminate flakes substantially absorb the one or more liquid solvents;
removing the one or more liquid solvents not absorbed by the cured composite laminate flakes;
a first heating step of heating the cured composite laminate flakes substantially absorbed with the one or more liquid solvents to a temperature below a lowest solvent boiling point of the one or more liquid solvents, and then a second heating step of heating more rapidly than the first heating step the cured composite laminate flakes substantially absorbed with the one or more liquid solvents to a temperature above a highest solvent boiling point of the one or more liquid solvents, so as to effect a liquid-to-gas phase change of the one or more liquid solvents in order to delaminate the cured composite laminate flakes; and, wherein the first and second heating steps result in delaminated recyclate that maintains a fiber volume fraction and a lamina level fiber alignment substantially the same as the cured composite laminate scrap.

8. The method of claim 7, further comprising separting, sorting and classifying the delaminated recyclate into delaminated recyclate with an intact resin matrix and delaminated recyclate without an intact resin matrix, wherein the sorting requires sorting contaminants separated from the cured composite laminate flakes.

9. The method of claim 8, further comprising feeding the delaminated recyclate with the intact resin matrix to a process or an apparatus for utilizing the delaminated recyclate with the intact resin matrix.

10. The method of claim 8, further comprising processing the delaminated recyclate without the intact resin matrix with steps comprising:
removing the resin matrix from the delaminated recyclate without the intact resin matrix;
applying a binder material to the plurality of fibers of the delaminated recyclate without the intact resin matrix in order to keep the plurality of fibers intact; and,
feeding the delaminated recyclate with the binder material to a process or an appartus for utilizing the delaminated recyclate without the intact resin matrix.

11. The method of claim 7, wherein the one or more liquid solvents is selected from the group consisting of water, benzyl alcohol, acetone, methyl ethyl ketone (MEK), hydrochloric acid, and a combination of one or more thereof.

12. A method for recycling a cured composite laminate material into a delaminated recyclate that maintains a fiber volume fraction and a lamina level fiber alignment substantially the same as the cured composite laminate material, the method comprising:
heating the cured composite laminate material comprising a resin matrix and a plurality of fibers having a fiber volume fraction and a lamina level fiber alignment in a nitrogen atmosphere to delaminate the cured composite laminate material,
wherein the heating step results in a delaminated recyclate comprising fibers with a resin matrix char, the delaminated recyclate maintaining a fiber volume fraction and a lamina level fiber alignment substantially the same as the cured composite laminate material.

13. The method of claim 12, further comprising processing the delaminated recyclate by adding a new resin matrix to the delaminated recyclate or by adding a binder material to the delaminated recyclate.

14. The method of claim 12, further comprising:
treating the cured composite laminate material by soaking in one or more liquid solvents so that the cured composite laminate material substantially absorbs the one or more liquid solvents;
removing the one or more liquid solvents not absorbed by the cured composite laminate material; and,
heating the cured composite laminate material substantially absorbed with the one or more liquid solvents to a temperature below a lowest solvent boiling point of the one or more liquid solvents.

15. The method of claim 12, wherein the method uses a controlled pyrolysis process to delaminate the cured composite laminate material and to pyrolize the resin matrix in between a plurality of lamina layers of the cured composite laminate material, leaving individual lamina having the plurality of fibers with a resin matrix char.

* * * * *